(12) United States Patent
Yamamoto et al.

(10) Patent No.: US 9,580,557 B2
(45) Date of Patent: Feb. 28, 2017

(54) ORGANO POLYSILOXANE, HARD COATING COMPOSITION, AND RESIN SUBSTRATE HAVING HARD COATING LAYER

(75) Inventors: Kyoko Yamamoto, Tokyo (JP); Takashi Shibuya, Tokyo (JP); Tatsuya Miyajima, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/240,697

(22) Filed: Sep. 22, 2011

(65) Prior Publication Data

US 2012/0058333 A1 Mar. 8, 2012

Related U.S. Application Data

(63) Continuation of application No. PCT/JP2010/055276, filed on Mar. 25, 2010.

(30) Foreign Application Priority Data

Mar. 27, 2009 (JP) ................................ 2009-080355

(51) Int. Cl.
*B32B 27/00* (2006.01)
*C08G 77/16* (2006.01)
(Continued)

(52) U.S. Cl.
CPC ........... *C08G 77/16* (2013.01); *C09D 183/04* (2013.01); *C08G 77/18* (2013.01); *Y10T 428/265* (2015.01);
(Continued)

(58) Field of Classification Search
None
See application file for complete search history.

(56) References Cited

U.S. PATENT DOCUMENTS 3,775,171 A * 11/1973 Hermes .................. 428/336
5,030,699 A * 7/1991 Motoyama et al. ......... 525/477
(Continued)

FOREIGN PATENT DOCUMENTS

EP 786489 A1 * 7/1997 ............ C08G 77/16
JP 2-150430 6/1990
(Continued)

OTHER PUBLICATIONS

SciFinder, Accession No. 2008:589043 Oh (2008).*
(Continued)

*Primary Examiner* — Kenneth Stachel
(74) *Attorney, Agent, or Firm* — Oblon, McClelland, Maier & Neustadt, L.L.P.

(57) ABSTRACT

An organo polysiloxane to improve the abrasion and weather resistance of a hard coating layer obtained from a silicone-type hard coating composition. The hard coating composition contains a first organo polysiloxane having silicone-containing bond units selected from the group consisting of R—Si(—OX)$_2$(—O*—), R—Si(—OX)(—O*—)$_2$ and R—Si(—O*—)$_3$) and a second organo polysiloxane having the same, where the second organo polysiloxane has a weight average molecular weight of 1/10 to 1/1.5 times that of the first organo polysiloxane. Further, a resin substrate having a hard coating layer made of a cured product of the hard coating composition that has improved abrasion and weather resistance. For resin substrates used in a bent state, the hard coating layer also improves the cracking resistance associated with mechanical stress.

28 Claims, 1 Drawing Sheet

(51) Int. Cl.
*C09D 183/04* (2006.01)
*C08G 77/18* (2006.01)

(52) U.S. Cl.
CPC ............... *Y10T 428/31507* (2015.04); *Y10T 428/31663* (2015.04)

(56) References Cited

U.S. PATENT DOCUMENTS

| | | | |
|---|---|---|---|
| 6,147,156 | A | 11/2000 | Yamaya et al. |
| 6,852,368 | B2 | 2/2005 | Takaguchi et al. |
| 7,052,770 | B2 | 5/2006 | Furuya et al. |
| 2002/0132908 | A1 | 9/2002 | Yagihashi et al. |
| 2003/0236347 | A1* | 12/2003 | Furuya et al. ............... 524/588 |
| 2004/0158018 | A1* | 8/2004 | Kobayahi ............... C08G 77/04 528/10 |
| 2005/0239985 | A1* | 10/2005 | Lichtenhan et al. ............ 528/15 |
| 2006/0058436 | A1* | 3/2006 | Kasler ............... C09D 175/04 524/261 |
| 2006/0172136 | A1* | 8/2006 | Komori ............... B05D 7/53 428/412 |
| 2008/0108206 | A1* | 5/2008 | Shimomura et al. ......... 438/481 |
| 2010/0221557 | A1* | 9/2010 | Higuchi ............... C08J 7/04 428/447 |

FOREIGN PATENT DOCUMENTS

| | | |
|---|---|---|
| JP | 10-30068 | 2/1998 |
| JP | 10323619 A * | 12/1998 |
| JP | 2003-510337 | 3/2003 |
| JP | 2004-75970 | 3/2004 |
| JP | 2007-313804 | 12/2007 |
| WO | WO 97/07156 | 2/1997 |
| WO | WO 02/088268 | 11/2002 |

OTHER PUBLICATIONS

Sangar J Sol Gel Sci Technol (2009).*
English machine translation JP 10-323619 (1998).*
"Preparation and Properties of Polysilsesquioxanes. Function and Characterization of Coating Agents and Films", Abe et al. JI of Non-Crystalline Solids 261, pp. 39-51 (2000).*
Preparation and Properties of Alkoxy(methyl)silsesquioxanes as Coating Agents, Takahiro Gunji, Yoshimoto Abe, et al; JI. of Polymer Science Part A Polymer Chemistry, vol. 42, 3676-3684 (2004).*
Preparation and Properties of Polysilsesquioxanes Polysilsesquioxanes and Flexible Thin Films et seq, Takamura & Abe et al., JI. of Polymer Science: Part A: Polymer Chemistry, vol. 37, 1017-1026 (1999).*
International Search Report issued Jul. 6, 2010 in PCT/JP2010/055276 filed Mar. 25, 2010.
Extended Search Report issued Sep. 6, 2012 in European Patent Application No. 10756185.4-2115/2412747.
Takahiro Kondo, et al., "Photoprobe Study of Siloxane Polymers. 3. Local Free Volume of Polymethylsilsesquioxane Probed by Photoisomerization of Azobenzene", Macromolecules, XP55036635, vol. 33, No. 10, May 1, 2000, pp. 3650-3658.
Libor Matejka, et al., "Cage-Like Structure Formation During Sol-Gel Polymerization of Glycidyloxypropyltrimethoxysilane", Journal of Non-Crystalline Solids, 270, XP55036659, 2000, pp. 34-47.
U.S. Appl. No. 13/541,874, filed Jul. 5, 2012, Yamamoto, et al.
U.S. Appl. No. 13/531,903, filed Jun. 25, 2012, Yamamoto, et al.

* cited by examiner

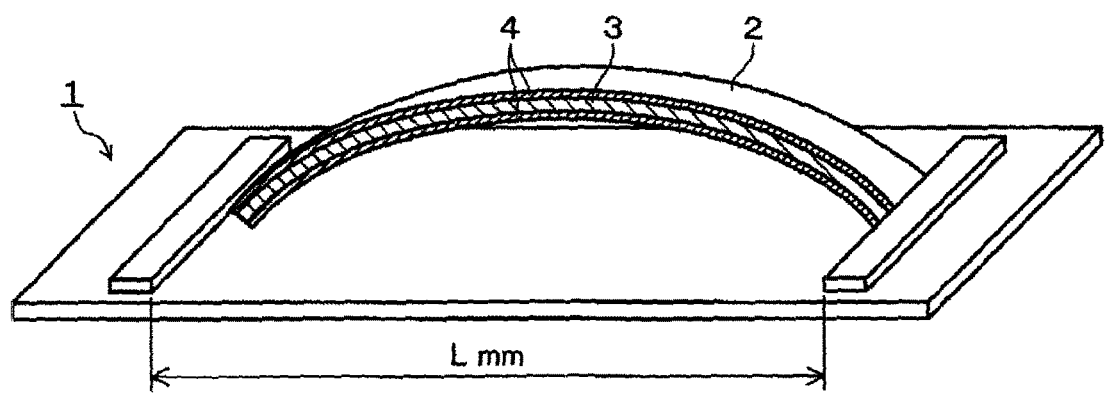

ORGANO POLYSILOXANE, HARD COATING COMPOSITION, AND RESIN SUBSTRATE HAVING HARD COATING LAYER

TECHNICAL FIELD

The present invention relates to an organo polysiloxane, a hard coating composition containing such an organo polysiloxane, and a resin substrate having a hard coating layer formed by using such a hard coating composition.

BACKGROUND ART

In recent years, as a window glass for a vehicle such as an automobile and a window glass for a building material to be attached to a building construction such as a house or a building, demands for a transparent resin plate are increasing instead of a conventional inorganic glass plate. Particularly, for a vehicle such as an automobile, for weight saving, use of a transparent resin plate as a window material has been proposed, and especially, an aromatic polycarbonate transparent resin plate is excellent in fracture resistance, transparency, light weight properties, easy processability, etc., and its use has been studied as a promising window material for a vehicle. Further, demands for such a transparent resin plate are expanding also for budding materials such as roofs of public facilities, or translucent sound barriers for balconies, carports, arcades or highways. However, such a transparent resin plate has had problems with respect to the abrasion resistance or weather resistance when it is used in place of a glass plate. Therefore, it has been proposed to form a coating film on the surface of a transparent resin plate by means of various hard coating agents, particularly silicone type hard coating agents, for the purpose of improving the abrasion resistance and weather-resistance of the transparent resin plate.

As an example of such a proposal, Patent Document 1 discloses a technique wherein an inorganic layer is formed on a polymer substrate for resin glass, and an alkoxysilane-containing hard coating layer is formed via such an inorganic layer. Further, Patent Document 2 discloses a technology of a coating composition which contains an organo polysiloxane resin having (meth)acrylic functional substituents and silanol groups.

Each of them is a technique relating to a silicone type hard coating layer which is capable of imparting the abrasion resistance and weather resistance as formed on a transparent resin plate, but the technique of Patent Document 1 is one to improve the adhesion of the hard coating layer, and the technique of Patent Document 2 is to improve the storage stability (weather resistance) as a coating composition, i. e. they are not ones to improve the abrasion resistance and weather resistance of the silicone type hard coating layer, for which further improvement of the performance is required.

On the other hand, in the case of the above transparent resin plate for building materials, applications are also increasing in which the resin plate is forcibly bent at ordinary temperature by so-called cold forming and is used in a bent state (hereinafter referred to as "use in a bent state"). Also in such applications, it is required to show an excellent property of the hard coating layer such as the solvent resistance, chemical resistance, etc., and the above mentioned further improvement of the performance is desired. In addition, use of a resin substrate having a silicone type hard coating layer having abrasion resistance and weather resistance to some extent, has been studied. However, the resin substrate having a silicone type hard coating layer has had problems such that it has no resistance against forcible bending at ordinary temperature, and due to cracking of the hard coating layer or formation of gathering of fine cracks (crazing) in the resin substrate, it lacks in transparency and is likely to undergo delamination of the hard coating layer or deterioration of the mechanical strength.

In order to use the resin substrate having a silicone type hard coating layer having weather-resistance in an application in a bent state or as a three dimensionally processed product, it is necessary to apply such a coating on a preliminarily bent resin substrate or to use a thermoformable resin substrate having a silicone type hard coating layer, but the hard coating layer itself is very sensitive to a thermal-stress and a bending stress, and cracks are likely to form after cooling a formed product to ordinary temperature, in many cases.

In order to solve such problems, Patent Document 3 discloses a technique for flexible silicone coating for a plastic substrate and for a process for producing a thermoformable abrasion resistant thermoplastic product, but there is no specific disclosure relating to forcible bending.

Therefore, it has been desired to develop a resin substrate having a silicone type hard coating layer which is capable of imparting sufficient abrasion resistance and weather resistance to a transparent resin substrate made of a polycarbonate type resin expected to be useful as various window materials or window materials for vehicles and which is capable of maintaining its excellent properties such as the transparency and fracture resistance for a long period of time, and further a resin substrate having a silicone type hard coating layer which can be used in a bent state and which has, in addition to the abrasion resistance and weather resistance, the cracking resistance when exposed to a mechanical stress.

PRIOR ART DOCUMENTS

Patent Documents

Patent Document 1: JP-A-2007-313804
Patent Document 2: JP-A-10-30068
Patent Document 3: JP-A-2-150430

DISCLOSURE OF INVENTION

Technical Problem

The present invention has been made to solve the above described problems of the prior art, and it is an object of the present invention to provide an organo polysiloxane which is capable of improving the abrasion resistance and weather resistance of a hard coating layer obtainable by using it in a silicone type hard coating composition which is capable of forming a hard coating layer excellent in the abrasion resistance and weather resistance on the surface of a resin substrate; a resin substrate having a hard coating layer excellent in the abrasion resistance and weather resistance; and further, a resin substrate having a silicone type hard coating layer, which can be used in a bent state and which has, in addition to the abrasion resistance and weather resistance, the cracking resistance when exposed to a mechanical stress.

Solution to Problem

The present invention provides an organo polysiloxane, referred to as organo polysiloxane (a) herein, which contains silicon-containing bond units represented by the following formulae T1 to T3 in a ratio of T1:T2:T3=0-5:15-40:55-85 and in a ratio of T3/T2=1.5-4.0, in number of such units, wherein the ratio of the number (B) of hydroxy groups bonded to silicon atoms to the number (A) of alkoxy groups bonded to silicon atoms in the molecule i.e. (B)/(A) is at least 12.0 on molecular average, and which has a weight average molecular weight of from 800 to 8,000:

R—Si(—OX)$_2$(—O*—)  T1: 

R—Si(—OX)(—O*—)$_2$  T2: 

R—Si(—O*—)$_3$  T3: 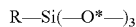

(wherein R is a hydrogen atom or a C$_{1-10}$ substituted or unsubstituted monovalent organic group, X is a hydrogen atom or a C$_{1-6}$ alkyl group, and O* is an oxygen atom linking two silicon atoms.)

Further, the present invention provides a hard coating composition comprising an organo polysiloxane (a) having silicon-containing bond units represented by the following formulae T1 to T3 and an organo polysiloxane (b) having the same silicon-containing bond units, wherein the organo polysiloxane (a) is the organo polysiloxane (a) as defined above, and the organo polysiloxane (b) is an organo polysiloxane having a weight average molecular weight between 1/10 and 1/1.5 of the weight average molecular weight of the organo polysiloxane (a):

R—Si(—OX)$_2$(—O*—)  T1: 

R—Si(—OX)(—O*—)$_2$  T2: 

R—Si(—O*—)$_3$  T3: 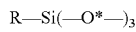

(wherein R is a hydrogen atom or a C$_{1-10}$ substituted or unsubstituted monovalent organic group, X is a hydrogen atom or a C$_{1-6}$ alkyl group, and O* is an oxygen atom linking two silicon atoms.)

Further, the present invention provides a resin substrate having, on at least one side thereof, a hard coating layer made of a cured product of the hard coating composition of the present invention.

Advantageous Effects of Invention

The organo polysiloxane of the present invention is capable of improving the abrasion resistance and weather resistance of a hard coating layer obtainable by using it in combination with another organo polysiloxane having a specific structure for a silicone type hard coating composition. By the hard coating composition of the present invention, it is possible to form a hard coating layer excellent in the abrasion resistance and weather resistance on the surface of a resin substrate and further to form a hard coating layer which can be used in a bent state and which has, in addition to the abrasion resistance and weather resistance, the cracking resistance when exposed to a mechanical stress. Further, the resin substrate having a hard coating layer of the present invention is excellent in the abrasion resistance and weather resistance.

BRIEF DESCRIPTION OF DRAWING

FIG. 1 is a perspective view of a jig to be used at the time of carrying out a forcible bending test against a resin substrate having a hard coating layer.

DESCRIPTION OF EMBODIMENTS

Now, embodiments of the present invention will be described.

Each of the organo polysiloxane of the present invention (hereinafter referred to as the organo polysiloxane (a)) and an organo polysiloxane (b) as another organo polysiloxane to be used in combination with the organo polysiloxane of the present invention in the after-mentioned hard coating composition, is a curable organo polysiloxane composed mainly of silicon-containing bond units so-called T units.

[Organo Polysiloxanes]

Usually, organo polysiloxanes are composed of silicon-containing bond units so-called M units, D units, T units or Q units. Among them, a curable organo polysiloxane is an oligomer-form polymer composed mainly of T units or Q units, and it may be a polymer composed solely of T units, a polymer composed solely of Q units, or a polymer composed of T units and Q units. Further, such polymers may contain a small amount of M units or D units.

Usually, in a curable organo polysiloxane, a T unit is a unit having one silicon atom, one hydrogen atom or monovalent organic group bonded to the silicon atom, and three oxygen atoms bonded to other silicon atoms (or functional groups which can be bonded to other silicon atoms). The monovalent organic group bonded to the silicon atom is a monovalent organic group wherein the atom bonded to the silicon atom is a carbon atom. The functional groups which can be bonded to other silicon atoms are hydroxy groups or groups which can be converted to hydroxy groups by hydrolysis (hereinafter referred to as hydrolyzable groups). The sum of the oxygen atoms bonded to other silicon atoms and the functional groups which can be bonded to other silicon atoms, is 3, and T units are classified into three types of units so-called T1, T2 and T3, depending upon the difference in number of the oxygen atoms bonded to other silicone atoms and the functional groups which can be bonded to other silicon atoms. In T1, the number of oxygen atoms bonded to other silicon atoms is 1, in T2, the number of such oxygen atoms is 2, and in T3, the number of such oxygen atoms is 3. In this specification, etc., an oxygen atom bonded to another silicon atoms is represented by O*, and a monovalent functional group which can be bonded to another silicon atom is represented by Z.

Here, O* representing an oxygen atom bonded to another silicon atom, is an oxygen atom linking two silicon atoms and is an oxygen atom in a bond represented by Si—O—Si. Accordingly, O* is one present between silicon atoms of two silicon-containing bond units. In other words, O* represents an oxygen atom shared between two silicon atoms of two silicon-containing bond units. In the after-mentioned chemical formulae of the fluorine-containing bond units, O* is represented as bonded to one silicon atom, but this O* is an oxygen atom shared by a silicon atom of another silicon-containing bond unit and does not mean that two silicon-containing bond units are bonded by a bond represented by Si—O*—O*—Si.

The above-mentioned M unit is a unit having three such organic groups and one O*; the D unit is a unit having two such organic groups and two O* (or one O*1 and one Z group); and the Q unit is a unit having no such an organic group and 4-O* (or a total of 4 i.e. from 1 to 3 O* and from 3 to 1 Z group). Each silicon-containing bond unit is formed from a compound having no oxygen atom (O*) bonded to another silicon atom (having only Z groups) (hereinafter sometimes referred to as a monomer). A monomer to form a T unit will be referred to as a T monomer. A monomer to form a M unit, a D unit or a Q unit may likewise be referred to as a M monomer, a D monomer or a Q monomer.

The monomer is represented by $(R'\text{---})_a Si(\text{---}Z)_{4-a}$, wherein a is an integer of from 0 to 3, R' is a hydrogen atom or a monovalent organic group, and Z is a hydroxy group or a monovalent functional group which can be bonded to another silicon atom. In this chemical formula, a compound wherein a=3 is the M monomer; a compound wherein a=2 is the D monomer; and a compound wherein a=1 is the T monomer; and a compound wherein a=0, is the Q monomer. In such monomers, the Z group is usually a hydrolyzable group. Further, in a case where 2 or 3 R' were present (in a case where a is 2 or 3), a plurality of R' may be different. R' is preferably one within the same scope as the after-mentioned preferred R.

A curable organo polysiloxane can be obtained by a reaction to convert some of Z groups in a monomer to O*. In a case where the organo polysiloxane is a copolymer comprising two or more silicon-containing bond units, such a copolymer is usually obtainable from a mixture of the respectively corresponding monomers. In a case where Z groups in a monomer are hydrolyzable groups, the Z groups are converted to hydroxy groups by a hydrolysis reaction, and then, by a dehydration condensation reaction between two hydroxy groups bonded to separate silicon atoms, the two silicon atoms will be linked via an oxygen atom (O*). In the curable organo polysiloxane, hydroxy groups (or non-hydrolyzed Z groups) remain, and at the time of curing of such a curable organo poly-siloxane, such hydroxy groups or Z groups are reacted in the same manner as described above, for curing. The cured product of the curable organo polysiloxane is a three dimensionally crosslinked polymer, and a cured product of a curable organo polysiloxane having many T units or Q units will be a cured product having a high crosslink density. At the time of curing, Z groups of a curable organo polysiloxane are converted to O*, but it is considered that some of Z groups (particularly hydroxy groups) will remain, so that the cured product will have hydroxy groups. In a case where a curable organo polysiloxane is cured at a high temperature, there may be a case where no substantial hydroxy groups will remain in the cured product.

In a case where Z groups in a monomer are hydrolyzable groups, such Z groups may, for example, be alkoxy groups, chlorine atoms, acyloxy groups or isocyanate groups. In many cases, as a monomer, a monomer wherein Z groups are alkoxy groups, is used. Alkoxy groups are hydrolyzable groups having a relatively low reactivity as compared with e.g. chlorine atoms, and in a curable organo polysiloxane obtainable by using a monomer wherein Z groups are alkoxy groups, unreacted alkoxy groups are present together with hydroxy groups, as Z groups, in many cases. In a case where Z groups in a monomer are hydrolyzable groups having a relatively high reactivity (such as chlorine atoms), most of Z groups in a curable organo polysiloxane obtainable by using such a monomer will be hydroxy groups. Therefore, in a usual curable organo polysiloxane, Z groups in the respective units constituting it are hydroxy groups, or hydroxy groups and alkoxy groups, in many cases.

[Organo Polysiloxanes in the Present Invention]

The organo polysiloxane (a) or (b) in the present invention is the above-described curable organo polysiloxane. Hereinafter, a curable organo polysiloxane will be referred to simply as an organo polysiloxane unless otherwise specified.

The organo polysiloxane (a) or (b) in the present invention is a polymer composed mainly of T units and may be a polymer containing a small amount of other units in addition to T units. As such other units, D units and Q units are preferred, and Q units are particularly preferred. The organo polysiloxane (a) or (b) in the present invention is an organo polysiloxane wherein the proportion in number of T units is from 50 to 100% to the total number of M units, D units, T units and Q units, preferably an organo polysiloxane wherein the proportion is from 70 to 100%, more preferably an organo polysiloxane wherein the proportion is from 90 to 100%. Further, as the organo polysiloxane (a), an organo polysiloxane wherein the proportion of T units is from 95 to 100%, is particularly preferred. When the proportion of T units is high, the desired cured product is obtainable. The proportions in number of M units, D units, T units and Q units can be calculated from values of peak area ratios by $^{29}$Si-NMR.

The organo polysiloxane (a) being an organo polysiloxane of the present invention, is an organo polysiloxane having T units represented by the following T1 to T3. The organo polysiloxane (b) is also an organo polysiloxane having T units represented by the following T1 to T3.

  T1:

  T2:

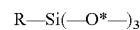  T3:

(wherein R is a hydrogen atom or a $C_{1-10}$ substituted or unsubstituted monovalent organic group, X is a hydrogen atom or a $C_{1-6}$ alkyl group, and O* is an oxygen atom linking two silicon atoms.)

In the above chemical formulae, R is not limited to one type, and each of T1, T2 and T3 may contain plural types of R. Further, in the above chemical formulae, —OX is a hydroxy group or an alkoxy group. Between T1 and T2, —OX may be the same or different. Two —OX in T1 may be different, and for example, one of them may be a hydroxy group and the other may be an alkoxy group. Further, when the two —OX are alkoxy groups, such alkoxy groups may be different alkoxy groups. However, as described hereinafter, the two alkoxy groups are usually the same alkoxy groups. Further, the organo polysiloxanes (a) and (b) are separate organo polysiloxanes, and in the above chemical formulae, R or —OX may be different between the two organo polysiloxanes.

Further, a T unit having three —OX only without having an oxygen atom (O*) linking two silicon atoms, will be hereinafter referred to as T0. Actually, T0 corresponds to a non-reacted T monomer contained in the organo polysiloxane and is not a silicon-containing bond unit. Such a T0 is measured in the same manner as T1 to T3 in the analysis of T1 to T3 units.

T0 to T3 in the organo polysiloxane can be analyzed by measuring the bonding states of silicon atoms in the organo polysiloxane by a nuclear magnetic resonance analysis ($^{29}$Si-NMR). The ratios in number of T0 to T3 are obtained from the peak area ratios in $^{29}$Si-NMR. —OX in the organo polysiloxane molecule can be analyzed by an infrared absorption analysis. The ratios in number of hydroxy groups and alkoxy groups bonded to silicon atoms can be obtained from the peak area ratios of the infrared absorption peaks of the two. The weight average molecular weight Mw, the number average molecular weight Mn and the dispersion degree Mw/Mn of the organo polysiloxane are values measured by using polystyrene as a standard substance by a gel permeation chromatography method. Such properties of an organo polysiloxane are not meant for the properties of a single-molecular, but are obtained as average properties of the respective molecules.

A plurality of T1, T2 or T3 present in one molecule of the organo polysiloxane (a) or (b) may be two or more different types. For example, there may be two or more T2 different in R. Such an organo polysiloxane is obtainable from a mixture of two or more T monomers. For example, it is considered that in an organo polysiloxane obtainable from a mixture of two or more T monomers different in R, two or more T1, T2 and T3, respectively, different in R are present. The ratio in number of different R in an organo polysiloxane obtained from a mixture of a plurality of T monomers different in R, reflects the compositional ratio in the mixture of the T monomers different in R. However, the ratio in number of units different in R in each of T1, T2 and T3 does not necessarily reflect the compositional ratio in the mixture of the T monomers different in R, because, for example, even if three —OX in the T monomers are the same, the reactivities of the T monomers, T1 and T2 may be different due to the difference in R.

The organo polysiloxanes (a) and (b) are preferably produced from at least one type of T monomers represented by R—Si(—OY)$_3$. In this formula, R is the same as the above-described R, and Y is a $C_{1-6}$ alkyl group. Y may be not only an unsubstituted alkyl group but also a substituted alkyl group such as an alkoxy-substituted alkyl group. Three Y in one molecule may be different. However, the three Y are usually the same alkyl group. Y is preferably an alkyl group having from 1 to 4 carbon atoms, more preferably 1 or 2 carbon atoms. Specifically, Y may, for example, be a methyl group, an ethyl group, a n-propyl group, a n-butyl group, a t-butyl group or a 2-methoxyethyl group.

R is a hydrogen atom or a $C_{1-10}$ substituted or unsubstituted monovalent organic group. The organic group is meant for an organic group wherein, as mentioned above, atoms bonded to silicon atoms are carbon atoms.

The unsubstituted monovalent organic group may be a hydrocarbon group such as an alkyl group, an alkenyl group, an alkynyl group, an cycloalkyl group, an aryl group or an aralkyl group. Such a hydrocarbon group is preferably a $C_{1-10}$ alkyl group, a $C_{2-10}$ alkenyl or alkynyl group, a $C_5$ or $C_6$ cycloalkyl group, a $C_{6-10}$ aryl group or a $C_{7-10}$ aralkyl group. Specifically, a methyl group, an ethyl group, a n-propyl group, a n-butyl group, an i-butyl group, a t-butyl group, a hexyl group, an octyl group, a decyl group, a vinyl group, an allyl group, a cyclohexyl group, a phenyl group, a benzyl group or a phenethyl group, may, for example, be mentioned.

The substituted monovalent organic group may, for example, be a hydrocarbon group having a hydrogen atom of a ring of e.g. a cycloalkyl group, an aryl group or an aralkyl group substituted by an alkyl group, or a substituted organic group having a hydrogen atom of the above mentioned hydrocarbon group substituted by e.g. a halogen atom, a functional group or a functional group-containing organic group. As the functional group, a hydroxy group, a mercapto group, a carboxy group, an epoxy group, an amino group or an cyano group may, for example, be preferred. As a halogen atom-substituted organic group, an alkyl group having a chlorine atom or a fluorine atom, such as a chloroalkyl group or a polyfluoroalkyl group, is preferred. As the functional group-containing organic group, an alkoxy group, an acyl group, an acyloxy group, an alkoxycarbonyl group, a glycidyl group, an epoxycyclohexyl group, an alkylamino group, a dialkylamino group, an arylamino group or an N-aminoalkyl-substituted aminoalkyl group is, for example, preferred. Particularly preferred is a chlorine atom, a mercapto group, an epoxy group, an amino group, an acryloyloxy group, a methacryloyloxy group, a glycidyl group, an alkylamino group or an N-aminoalkyl-substituted aminoalkyl group. A T monomer having a substituted organic group which is substituted by e.g. a functional group or a functional group-containing organic group, includes a compound in a category so-called a silane coupling agent.

As specific examples of the substituted organic group, the following organic groups may be mentioned: a 3-chloropropyl group, a 3,3,3-trifluoropropyl group, a 3-mercaptopropyl group, a p-mercaptomethylphenylethyl group, a 3-acryloyloxypropyl group, a 3-methacryloyloxypropyl group, a 3-glycidoxypropyl group, a 2-(3,4-epoxycyclohexyl)ethyl group, a 3-aminopropyl group, an N-phenyl-3-aminopropyl group, an N-(2-aminoethyl)-3-aminopropyl group, and a 2-cyanoethyl group.

As the above R, a particularly preferred monovalent organic group is a $C_{1-4}$ alkyl group. The organo polysiloxane (a) or (b) is preferably an organo polysiloxane which is obtainable by using one or more of T monomers each having a $C_{1-4}$ alkyl group. Further, the organo polysiloxane (a) or (b) is also preferably an organo polysiloxane which is obtainable by using at least one of T monomers each having a $C_{1-4}$ alkyl group and a small amount of another T monomer. The proportion of such another T monomer is preferably at most 30 mol %, particularly preferably at most 15 mol %, based on the total amount of T monomers. As such another T monomer, preferred is a T monomer having a substituted organic group which is substituted by a functional group or a functional group-containing organic group, in a category so-called a silane coupling agent.

Specifically, a T monomer having a $C_{1-4}$ alkyl group may, for example, be methyltrimethoxysilane, methyltriethoxysilane, methyltripropoxysilane, ethyltrimethoxysilane or ethyltriethoxysilane. Particularly preferred is methyltrimethoxysilane or ethyltrimethoxysilane. As specific examples of a T monomer having a substituted organic group or the like, the following compounds may, for example, be mentioned.

Vinyltrimethoxysilane, vinyltriethoxysilane, phenyltrimethoxysilane, phenyltriethoxysilane, 3-chloropropyltrimethoxysilane, 3,3,3-trifluoropropyltrimethoxysilane, 3-mercaptopropyltrimethoxysilane, 3-glycidoxypropyltrimethoxysilane, 3-glycidoxypropyltriethoxysilane, epoxycyclohexyl)ethyltrimethoxysilane, 2-(3,4-epoxycyclohexyl)ethyltriethoxysilane, 3-acryloyloxypropyltrimethoxysilane, 3-methacryloyloxypropyltrimethoxysilane, 3-aminopropyltrimethoxysilane, 3-aminopropyltriethoxysilane, N-(2-aminoethyl)-3-aminopropyltrimethoxysilane and 3-cyanoethyltrimethoxysilane.

A T monomer represented by (R'—)$_a$Si(—Z)$_{4-a}$ (a=3) other than the T monomer represented by R—Si(—OY)$_3$, may, for example, be methyltrichlorosilane, ethyltrichlorosilane, phenyltrichlorosilane, 3-glycidoxypropyltrichlorosilane, methyltriacetoxysilane or ethyltriacetoxysilane.

In a D monomer represented by (R'—)$_a$Si(—Z)$_{4-a}$ (a=2), the two R' may be the same or different. In a case where they are the same, they are preferably a $C_{1-4}$ alkyl group. In a case where they are different, it is preferred that one R' is a $C_{1-4}$ alkyl group, and the other R' is a substituted organic group which is substituted by the above mentioned functional group or functional group-organic group. Further, the Z group is preferably a $C_{1-4}$ alkoxy group, an acetoxy group or the like. As the D monomer, the following compounds may, for example, be mentioned.

Dimethyldimethoxysilane, dimethyldiethoxysilane, vinylmethyldiethoxysilane, vinylmethyldiethoxysilane, phenylmethyldimethoxysilane, phenylmethyldiacetoxysilane, 3-chloropropylmethyldimethoxysilane, 3,3,3-trifluoropropylmethyldimethoxysilane, 3-mercaptopropylmethyldiethoxysilane, 3-acryloyloxypropylmethyldimethoxysilane, 3-methacryloyloxypropylmethyldimethoxysilane, 3-aminopropylmethyldimethoxysilane, 3-aminopropylmethyldiethoxysilane, N-(2-aminoethyl)-3-aminopropylmethyldimethoxysilane and 3-cyanoethylmethyldimethoxysilane.

In a Q monomer represented by $(R'—)_aSi(—Z)_{4-a}$ (a=0), the four Z groups may be different, but they are usually the same. The Z group is preferably a $C_{1-4}$ alkoxy group, particularly preferably a methoxy group or an ethoxy group. As the Q monomer, the following compounds may, for example, be mentioned.

Tetramethoxysilane, tetraethoxysilane, tetra n-propoxysilane, tetra n-butoxysilane, tetra sec-butoxysilane and tetra t-butoxysilane.

The organo polysiloxane in the present invention can be obtained by subjecting the above T monomer or the like to partial hydrolytic condensation. Usually, this reaction is carried out by heating the T monomer or the like and water in a solvent. It is preferred that a catalyst is present in the reaction system. The desired organo polysiloxane can be produced by adjusting the reaction conditions such as the type of the monomer, the amount of water, the heating temperature, the type and amount of the catalyst, the reaction time, etc. In some cases, the desired organo polysiloxane may be produced by using a commercially available organo polysiloxane. Further, in the case of the organo polysiloxane (b) in the present invention, the corresponding commercially available organo polysiloxane can be used as it is.

The above catalyst is preferably an acid catalyst. The acid catalyst may, for example, be an inorganic acid such as hydrochloric acid, sulfuric acid, nitric acid, phosphoric acid, nitrous acid, perchloric acid or sulfamic acid, or an organic acid such as formic acid, acetic acid, propionic acid, butyric acid, oxalic acid, succinic acid, maleic acid, lactic acid or p-toluenesulfonic acid. Particularly preferred is acetic acid. The above solvent is preferably a hydrophilic organic solvent, particularly preferably an alcohol type solvent. The alcohol type solvent may, for example, be methanol, ethanol, 1-propanol, 2-propanol, 1-butanol, 2-butanol, 2-methyl-1-propanol, 2-ethoxyethanol, 4-methyl-2-pentanol or 2-buthoxyethanol. With respect to the reaction temperature, in a case where a catalyst is present, the reaction can be made at ordinary temperature. Usually, within a reaction temperature of from 20 to 80° C., a suitable temperature is selected for use depending upon the particular purpose.

The hydrolytic condensation reaction is a reaction whereby T1 is formed from T0 (T monomer), T2 is formed from T1, and T3 is formed from T2. The reaction rate is considered to be low in the order of the condensation reaction whereby T1 is formed from T0 having at least one hydrolyzable group converted to a hydroxy group, a condensation reaction whereby T2 is formed from T1 wherein at least one of the two —OX is hydroxy group, and a condensation reaction whereby T3 is formed from T2 wherein —OX is a hydroxy group. Also in consideration of a hydrolytic reaction of a hydrolyzable group, it is considered that the peak of the amount of each unit to be present moves from T0 to T3 as the reaction proceeds. In a case where the reaction conditions are relatively mild, it is considered that the movement of the peak of the amount present proceeds relatively steadily. On the other hand, in a case where the reaction conditions are relatively vigorous, the reaction proceeds randomly, whereby the distribution of the amount of each unit present tends to be flat, and the amount of T0 or T1 present tends to be large as compared with the amount of T2 or T3 present. As described hereinafter, the organo polysiloxane (a) in the present invention is an organo polysiloxane having a relatively high molecular weight wherein the amount of T0 or T1 present is small, and the ratio in the amount present of T2 to T3 is in a specific range, and such an organo polysiloxane can be produced by selecting relatively mild reaction conditions.

The reactivity for the above condensation reaction changes depending on R, and if R differs, the reactivity of a hydroxy group also changes. Usually, as R becomes small (for example, in a case where R is an alkyl group, as the number of carbon atoms in the alkyl group becomes small), the reactivity of a hydroxy group becomes high. Accordingly, it is preferred to select the T monomer taking into consideration the relation between the reactivity of the hydrolyzable group and the reactivity of the hydroxy group.

Further, the rate of the hydrolysis reaction of a hydrolyzable group to a hydroxy group changes depending upon the type of the hydrolyzable group, and it is preferred to take into consideration the relation with the rate of the condensation reaction. For example, in a case where an OX group in T2 is an alkoxy group, if its hydrolysis reaction rate is too slow, T2 wherein the OX group is a hydroxy group becomes less. Likewise, if the hydrolysis reaction rate is too slow, T1 wherein the OX group is a hydroxy group becomes less. Therefore, it becomes difficult to obtain an organo polysiloxane wherein the ratio in amount of the hydroxy group to the alkoxy group is high. Accordingly, the alkoxy group being an OX group is preferably an alkoxy group having a high reactivity i.e. an alkoxy group having a small number of carbon atoms, and a methoxy group is most preferred. In a case where the reactivity of a hydrolyzable group is sufficiently high, it is possible to obtain an organo polysiloxane having a high proportion of hydroxy groups from an organo polysiloxane having a high proportion of hydrolyzable groups without proceeding with the condensation reaction so much.

[Organo Polysiloxane (a)]

An organo polysiloxane (a) being the organo polysiloxane of the present invention contains the respective units T1 to T3 in a ratio of T1:T2:T3=0-5:15-40:55-85 and in a ratio of T3/T2=1.5-4.0. Further, with respect to OX groups in the organo polysiloxane (a), the ratio of the number (B) of them being hydroxy groups to the number (A) of them being alkoxy groups i.e. (B)/(A) is at least 12.0 on molecular average. And, the weight average molecular weight of the organo polysiloxane (a) is from 800 to 8,000. Further, the organo polysiloxane (a) does not substantially contain T0 as a T monomer.

With respect to the proportions of T1, T2 and T3 constituting the organo polysiloxane (a), in addition to the above conditions, (T2+T3)/(T1+T2+T3) is preferably within a range of from 0.85 to 1.00, more preferably from 0.90 to less than 1.00. Further, with respect to T3/T2, a preferred range is from 2.0 to 4.0.

By adjusting the proportions of T1, T2 and T3 constituting the organo polysiloxane (a) to be in such ranges in an average composition of the respective molecules, it becomes possible that when the organo polysiloxane (a) is combined with the after-described organo polysiloxane (b) to form a hard coating composition of the present invention, the abrasion resistance and weather resistance of the obtainable hard coating layer can be improved.

The ratio of (B)/(A) in the organo polysiloxane (a) is a parameter indicating the condensation reactivity, and if this value becomes large, i.e. if the proportion of hydroxy groups becomes high as compared with alkoxy groups, the curing reaction at the time of forming a hard coating layer will be accelerated when the organo polysiloxane (a) and the organo polysiloxane (b) are combined and used as a hard coating composition. Further, alkoxy groups which remain to be unreacted at the time of forming the hard coating layer, are likely to lead to deterioration of the abrasion resistance of the hard coating layer and may cause microcracks if post curing proceeds, and therefore, the proportion of hydroxy groups should better be high as compared with alkoxy groups. The ratio of (B)/(A) in the organo polysiloxane (a) is at least 12.0, preferably at least 16.0. Further, (A) may be 0.

If the value of (B)/(A) is less than 12.0, the proportion of hydroxy groups tends to be too low as compared with alkoxy groups, whereby the effect to accelerate the curing reaction tends to be hardly obtainable, and by the influence of alkoxy groups, deterioration of the abrasion resistance is likely to be led, or post curing is likely to proceed to cause micro cracking. That is, if the value of (B)/(A) is less than 12.0, at the time of forming a hard coating layer, a part of the organo polysiloxane (a) is likely to be included in the three dimensional crosslink structure (network) formed by the curing reaction of the organo polysiloxane (a) and the organo polysiloxane (b) and is likely to bleed out, thus causing problems such that the crosslinking density decreases, the abrasion resistance cannot be obtained, and the curing tends to hardly proceed.

The weight average molecular weight of the organo polysiloxane (a) is from 800 to 8,000, preferably from 1,000 to 6,000. As the weight average molecular weight of the organo polysiloxane (a) is within this range, it is possible that when the organo polysiloxane (a) and the organo polysiloxane (b) are used in combination for a hard coating composition of the present invention, it is possible to improve the abrasion resistance and weather resistance of the obtainable hard coating layer.

In the present invention, in order to obtain an organo polysiloxane (a) of the present invention to be used for a hard coating composition to form a hard coating layer excellent particularly in the abrasion resistance, it is preferred to use a raw material hydrolyzable silane compound wherein at least 70 mass % of all T monomers is a methyl trialkoxysilane, wherein the number of carbon atoms of the alkoxy groups is from 1 to 4. However, for the purpose of improving the adhesion or providing functions such as hydrophilicity, water repellency, etc. T monomers other than the methyl trialkoxysilane may be used in combination in a small amount.

As a method for producing the organo polysiloxane (a) as mentioned above, the monomer is subjected to a hydrolytic condensation reaction in a solvent in the presence of an acid catalyst. Here, water required for the hydrolysis is usually from 1 to 10 equivalents, preferably from 1.5 to 7 equivalents, more preferably from 3 to 5 equivalents, per 1 equivalent of the monomer. The hydrolysis and condensation of the monomer can be carried out in a reaction system where a colloidal silica (as described hereinafter) is present, and in a case where an aqueous dispersion type colloidal silica is used as such a colloidal silica, water is supplied from such an aqueous dispersion. The amount of the acid catalyst to be used is preferably from 0.1 to 50 parts by mass, particularly preferably from 1 to 20 parts by mass, per 100 parts by mass of the monomer. As the solvent, the above-mentioned alcohol type solvent is preferred, and specifically, methanol, ethanol, 2-propanol, 1-butanol or 2-butanol is particularly preferred from such a viewpoint that the solubility of the obtainable organo polysiloxane (a) will be good.

Usually, the reaction temperature is from 20 to 40° C., and the reaction time is from 1 hour to a few days. The hydrolytic condensation reaction of the monomer is an exothermic reaction, but the temperature of the system should better not exceed 60° C. It is preferred that under such conditions, the hydrolysis reaction is sufficiently proceeded, and then for the stability of the obtainable organo polysiloxane, the condensation reaction is proceeded at a temperature of from 40 to 80° C. for from 1 hour to a few days.

The organo polysiloxane (a) may also be produced from a commercially available organo polysiloxane. A commercially available organo polysiloxane is usually an organo polysiloxane wherein the proportion of alkoxy groups is high as compared with hydroxy groups, and accordingly, it is preferred that by using a commercially available organo polysiloxane similar to the desired organo polysiloxane (a) except for the ratio of (B)/(A), the proportion of hydroxy groups is increased by a hydrolysis reaction to produce the organo polysiloxane (a).

A commercially available organo polysiloxane useful as a raw material for the organo polysiloxane (a), may, for example, be the following organo polysiloxane which is a partial hydrolytic condensation product of methyltrimethoxysilane. Here, the symbol "ND" means that when the peak area ratio of $^{29}$Si-NMR is measured by means of nuclear magnetic resonance analyzer ECP400 (tradename) manufactured by JEOL Ltd., the result is not more than a detectable level (the same applies hereinafter).

Methyl type silicone resin KR-220L (tradename, manufactured by Shin-Etsu Chemical Co., Ltd.); T0:T1:T2:T3=ND:ND:28:72, Si—OH/SiO—$CH_3$=11.7, weight average molecular weight of Mw=4,720, number average molecular weight Mn=1,200, Mw/Mn=3.93.

Methyl type silicone resin KR-500, (tradename, manufactured by Shin-Etsu Chemical Co., Ltd.); T0:T1:T2:T3=ND:15:58:27, the peak attributable to the Si—OH group is not detected by FT-IR, substantially only SiO—$CH_3$ is present. Mw=1,240, Mn=700, Mw/Mn=1.77.

In a case where an organo polysiloxane (a) is produced from such a commercially available organo polysiloxane, it is preferred to subject the commercially available organo polysiloxane to mainly the hydrolysis of alkoxy groups in the presence of an acid catalyst. For example, a method may be mentioned wherein to the commercially available organo polysiloxane, a solvent in an amount of from 0 to 10 times (by mass) is added and thoroughly mixed, and then an aqueous acid solution at a concentration of from about 0.1 to 70 mass % is added, followed by stirring at a temperature of from 15 to 80° C., preferably from 20 to 70° C., for from 1 to 24 hours. As the solvent to be used, water may be used, or the above mentioned alcohol type solvent having water added thereto, may also be used.

[Organo Polysiloxane (b)]

The hard coating composition of the present invention comprises the organo polysiloxane (a) and the organo polysiloxane (b). The organo polysiloxane (b) is an organo polysiloxane having a weight average molecular weight between 1/10 and 1/1.5 of the weight average molecular weight of the organo polysiloxane (a). The organo polysiloxane (b) is an organo polysiloxane having a weight average molecular weight-smaller than the organo polysiloxane (a) and has the above-described units T1 to T3. The ratio in number of T1:T2:T3, the ratio of T3/T2 and the ratio of (B)/(A) are not particularly limited.

The weight average molecular weight of the organo polysiloxane (b) is preferably between 1/8 and 1/1.5 of the weight average molecular weight of the organo polysiloxane (a) to be combined. If the weight-average molecular weight of the organo polysiloxane (b) exceeds 1/1.5 of the weight average molecular weight of the organo polysiloxane (a), i.e. if the weight average molecular weight of the organo polysiloxane (a) is less than 1.5 times the weight average molecular weight of the organo polysiloxane (b), the toughness of the obtainable hard coating layer tends to be low, and such becomes a cause to form cracks. Further, if the weight average molecular weight of the organo polysiloxane (b) is less than 1/10 of the weight average molecular weight of the organo polysiloxane (a), i.e. if the weight average molecular weight of the organo polysiloxane (a) exceeds ten times the weight average molecular weight of the organo polysiloxane (b), the abrasion resistance of the obtainable hard coating layer tends to be low, whereby it becomes difficult to obtain a hard coating layer having sufficient abrasion resistance.

A more preferred organo polysiloxane (b) is an organo polysiloxane wherein the respective silicon-containing bond units represented by T0, T1, T2 and T3 are within a range of T0:T1:T2:T3=0-5:0-50:5-70:10:90, in a ratio by number of such units. The proportions of T0 and T1 in the organo polysiloxane (b) being large usually indicates that at the time of producing such an organo polysiloxane, the hydrolytic reaction or the condensation reaction of the raw material monomer was insufficient. In the organo polysiloxane (b), if the proportions of T0 and T1 are large, at the time of heat curing to form a hard coating layer by using a hard coating composition of the present invention comprising it and the organo polysiloxane (a), formation of cracks tends to increase. Further, usually, if the condensation reaction of the raw material monomer is proceeded too much at the time of producing an organo polysiloxane, the proportion of T3 in the obtainable organo polysiloxane tends to be high. In the organo polysiloxane (b), if the proportion of T3 becomes higher than necessary, a proper crosslinking reaction tends to be difficult at the time of heat curing to form a hard coating layer by using the hard coating composition of the present invention comprising it and the organo polysiloxane (a), whereby the hard coating layer may not be formed, or it becomes difficult to obtain a hard coating layer having sufficient abrasion resistance.

The organo polysiloxane (b) can be produced from a T monomer or the like in the same manner as the organo polysiloxane (a). Further, a commercially available organo polysiloxane may be used as it is, as the organo polysiloxane (b). The following organo polysiloxanes may, for example, be mentioned as commercially available organo polysiloxanes which can be used as the organo polysiloxane (b). Here, the symbol "trace" means that when the peak area ratio of $^{29}$Si-NMR is measured by means of a nuclear magnetic resonance analyzer ECP400 (tradename) manufactured by JEOL Ltd., it is at least 0.01 and at most 0.25 (the same applies hereinafter).

TOSGUARD 510 (tradename, manufactured by Momentive Performance Materials, Inc.); molecular weight: Mn=1, 370, Mw=1,380, Mw/Mn=1.01. Number of T units: (total amount of the respective numbers of M units, D units and Q units)=at least 99.9:ND. T0:T1:T2:T3=ND:2:36:62.

KP851 (tradename: manufactured by Shin-Etsu Chemical Co., Ltd.); molecular weight: Mn=1,390, Mw=1,400, Mw/Mn=1.01. Number of T units: (total amount of the respective numbers of M units and D units)=at least 99.9: ND. T0:T1:T2:T3=trace:21:58:21.

[Hard Coating Composition]

The hard coating composition of the present invention comprises the organo polysiloxane (a) and the organo polysiloxane (b). The contents of the organo polysiloxane (a) and the organo polysiloxane (b) in the hard coating composition of the present invention may vary depending on the weight average molecular weights of the respective components, but based on the total amount of the composition excluding the solvent (hereinafter referred to as "the nonvolatile component" as the case requires), it is preferred that the content of the organo polysiloxane (a) is from 1 to 35 mass %, and the content of the organo polysiloxane (b) is from 40 to 65 mass %, and it is more preferred that the content of the organo polysiloxane (a) is from 5 to 25 mass %, and the content of the organo polysiloxane (b) is from 45 to 65 mass %. In this specification, the amount of the nonvolatile component is one measured on the basis of a change in mass of the hard coating composition after being left at 150° C. for 45 minutes.

If the content of the organo polysiloxane (a) in the non-volatile component in the hard coating composition of the present invention is less than 1 mass %, the toughness of the obtainable hard coating layer tends to be low, and cracks are likely to be formed by use for a long period of time, and if the content exceeds 35 mass %, the hardness of the obtainable hard coating layer tends to be low. Further, if the content of the organo polysiloxane (b) in the non-volatile component in the hard coating composition of the present invention is less than 40 mass %, the total proportion of organo polysiloxanes having components (a) and (b) in the non-volatile component put together tends to be relatively too low, whereby it tends to be difficult to form a hard coating layer by heat curing of the organo polysiloxanes, or cracks are likely to be formed in the obtainable hard coating layer. On the other hand, if the content of the organo polysiloxane (b) exceeds 65 mass %, the toughness of the obtainable hard coating layer tends to be low, and cracks are likely to be formed by use for a long period of time.

Further, the ratio in content of the organo polysiloxane (b) to the organo polysiloxane (a) in the hard coating composition of the present invention is preferably from 1.5 to 30 times, more preferably from 2 to 15 times, by mass ratio. When the hard coating composition of the present invention contains components (a) and (b) in such a ratio, the three dimensional crosslinking structure of organo polysiloxanes formed by the curing reaction will be one having the organo polysiloxane component (a) partially incorporated in the three dimensional crosslinking structure composed mainly of the organo polysiloxane (b), whereby the weather resistance and abrasion resistance of a obtainable hard coating layer will be good.

The hard coating composition of the present invention may contain various additives in addition to the above organo polysiloxane (a) and the organo polysiloxane (b). For example, in order to further improve the abrasion resistance of the had coating layer of a resin substrate having the hard coating layer of the present invention, a hard coating composition containing fine silica particles (c) is preferred. For such a purpose, it is preferred to incorporate colloidal silica to the hard coating composition. Here, the colloidal silica is meant for one having fine silica particles dispersed in water or an organic solvent such as methanol, ethanol, isobutanol or propylene glycol monomethyl ether. Such colloidal silica may suitably be incorporated at the time of producing the hard coating composition of the present invention to prepare a hard coating composition of the present invention containing fine silica particles (c).

Otherwise, fine silica particles (c) may be incorporated to the raw material monomer in a step of producing the organo polysiloxane (a) or the organo polysiloxane (b). By producing the organo polysiloxane (a) or (b) in a reaction system containing colloidal silica, it is possible to obtain the organo polysiloxane (a) or (b) containing fine silica particles (c). For example, by adding a T monomer and, if required, water or an acid catalyst, to colloidal silica, it is possible to produce the organo polysiloxane (a) or (b) as described above in the dispersion of colloidal silica. By using the organo polysiloxane (a) or (b) thus obtained, it is possible to produce a hard coating composition of the present invention containing fine silica particles (c).

The fine silica particles (c) to be used for the hard coating composition of the present invention preferably has an average particle size (BET method) of from 1 to 100 nm. If the average particle size exceeds 100 nm, the particles will diffusely reflect light, whereby the haze value of the obtainable hard coating layer tends to be large, such being undesirable from the viewpoint of the optical quality. Further, the average particle size is particularly preferably from 5 to 40 nm, whereby the transparency of the hard coating layer can be maintained while imparting the abrasion resistance to the hard coating layer. Further, the colloidal silica may be used in either in a water-dispersed type or an organic solvent-dispersed type, but it is preferred to use a water-dispersed type. Further, it is particularly preferred to use colloidal silica dispersed in an acidic aqueous solution. Further, to the colloidal silica, fine inorganic particles other than fine silica particles, such as alumina sol, titanium sol or ceria sol, may be incorporated.

The content of the fine silica particles (c) in the hard coating composition of the present invention is preferably from 1 to 50 mass %, more preferably from 5 to 40 mass %, based on the total amount of the composition excluding the solvent (the non-volatile component). If the content of the fine silica particles (c) in the non-volatile component in the hard coating composition of the present invention is less than 1 mass %, adequate abrasion resistance may not be secured in the obtainable hard coating layer, and if the content exceeds 50 mass %, the total proportion of organo polysiloxanes having the organo polysiloxanes (a) and (b) in the non-volatile component put together, tends to be too low, whereby it tends to be difficult to form a hard coating layer by heat curing of the organo polysiloxanes, cracking is likely to be formed in the obtainable hard coating layer, or aggregation of fine silica particles (c) is likely to take place to deteriorate the transparency of the hard coating layer.

Thus, as the contents of the organo polysiloxane (a), the organo polysiloxane (b) and the fine silica particles (c) in the hard coating composition of the present invention, based on the total amount of the composition excluding the solvent, it is preferred that the content of the above (a) is from 1 to 35 mass %, the content of the above (b) is from 40 to 65 mass %, and the content of the above (c) is from 1 to 50 mass %, and it is more preferred that the content of the above (a) is from 5 to 25 mass %, the content of the above (b) is from 45 to 65 mass %, and the content of the above (c) is from 10 to 40 mass %. By using such a hard coating composition having the contents of (a) to (c) adjusted to be within the above ranges, it is possible to obtain a hard coating layer which is preferred with respect to the chemical resistance, transparency, abrasion resistance and weather resistance.

The hard coating composition of the present invention may further contain an additive such as a defoaming agent or a viscosity-adjusting agent for the purpose of improving the coating properties on a resin substrate, may contain an additive such as an adhesion-imparting agent for the purpose of improving the adhesion to the resin substrate, or may contain a leveling agent as an additive for the purpose of improving the coating properties on the resin substrate and the smoothness of the coating film thereby obtainable. The amounts of such additives to be incorporated are preferably from 0.01 to 2 parts by mass of each additive, based on 100 parts by mass in total of the organo polysiloxane (a) and the organo polysiloxane (b). Further, the hard coating composition of the present invention may contain a dye, a pigment, a filler, etc. within a rage not to impair the purpose of the present invention.

The hard coating composition of the present invention may further contain a curing catalyst. The curing catalyst may, for example, be an alkali metal salt such as a lithium-salt, a sodium salt or a potassium salt, of an aliphatic carboxylic acid (such as formic acid, acetic acid, propionic acid, butyric acid, lactic acid, tartaric acid or succinic acid); a quaternary ammonium salt such as a benzyltrimethylammonium salt, a tetramethylammonium salt or tetraethylammonium salt; a metal alkoxide or chelate of e.g. aluminum, titanium or cerium; ammonium perchlorate, ammonium chloride, ammonium sulfate, sodium acetate, an imidazole or its salt, ammonium trifluoromethyl sulfonate, or bis(trifluoromethylsulfonyl)bromomethyl ammonium. Here, the amount of the curing catalyst to be incorporated is preferably from 0.01 to 10 parts by mass, more preferably from 0.1 to 5 parts by mass, per 100 parts by mass in total of the organo polysiloxane (a) and the organo polysiloxane (b). If the content of the curing catalyst is less than 0.01 part by mass, a sufficient curing rate tends to be hardly obtainable, and if it exceeds 10 parts by mass, the storage stability of the hard coating composition tends to be deteriorated, or precipitates are likely to be formed.

Further, the hard coating composition of the present invention preferably further contains an ultraviolet absorber to prevent yellowing of the resin substrate. Such an ultraviolet absorber may, for example, be a benzophenone type ultraviolet absorber, a benzotriazole type ultraviolet absorber, a benzimidazole type ultraviolet absorber, a cyanoacrylate type ultraviolet absorber, a salicylate type ultraviolet absorber, a benzylidenemalonate type ultraviolet absorber or a triazine type ultraviolet absorber. One type of such ultraviolet absorbers may be used alone, or two or more types may be used in combination. Further, in order to prevent bleeding out of such an ultraviolet absorber from the hard coating layer, an ultraviolet absorber having a trialkoxysilyl group will be converted to a hydroxy group by a hydrolytic reaction at the time of forming a hard coating layer by heat curing of the organo polysiloxane, and then incorporated in the hard coating layer by a dehydration condensation reaction, whereby it is possible to prevent bleeding out of the ultraviolet absorber from the hard coating film. Specifically, such a trialkoxysilyl group may, for example, be a trimethoxysilyl group or a triethoxysilyl group. The content of the ultraviolet absorber in the hard coating composition is preferably from 0.1 to 50 parts by mass, particularly preferably from 0.1 to 30 parts by mass, per 100 parts by mass in total of the organo polysiloxane (a) and the organo polysiloxane (b).

Further, in the present invention, in order to prevent gelation of the hard coating composition at ordinary temperature and to increase the storage stability, it is preferred to adjust the pH of the hard coating composition to be from 3.0 to 6.0, more preferably from 4.0 to 5.5. If the pH is at most 2.0 or at least 7.0, hydroxy groups bonded to silicon atoms tend to be very unstable, such being not suitable for storage. As a means to adjust the pH, addition of an acid or adjustment of the content of the curing catalyst may, for example, be mentioned. Such an acid may, for example, be an inorganic acid such as hydrochloric acid, sulfuric acid, nitric acid, phosphoric acid, nitrous acid, perchloric acid or sulfamic acid, or an organic acid such as formic acid, acetic acid, propionic acid, butyric acid, oxalic acid, succinic acid, maleic acid, lactic acid or p-toluenesulfonic acid.

The hard coating composition of the present invention is usually prepared in a form wherein the organo polysiloxane (a) and the organo polysiloxane (b) as the essential components, and various additives as optional components, are dissolved or dispersed in a solvent. It is necessary that all non-volatile components in the hard coating composition are stably dissolved or dispersed, and for such a purpose, the solvent is contained in an amount of at least 20 mass %, preferably at least 50 mass %, based on the total amount of the composition.

As an alcohol to be used for such a solvent, methanol, ethanol, 1-propanol, 2-propanol, 1-butanol, 2-butanol, 2-methyl-1-propanol, 1-methoxy-2-propanol, 2-ethoxyethanol, 4-methyl-2-pentanol or 2-butoxyethanol is preferred. Among them, an alcohol having a boiling point of from 80 to 160° C. is preferred from such a viewpoint that the solubility of the organo polysiloxane (a) and the organo polysiloxane (b) is good, and the coating properties on the resin substrate are good. Specifically, ethanol, 1-propanol, 2-propanol, 1-butanol, 2-butanol, 2-methyl-1-propanol, 1-methoxy-2-propanol, 2-ethoxyethanol, 4-methyl-2-pentanol or 2-butoxyethanol is preferred.

Further, the solvent to be used for the hard coating composition of the present invention includes a lower alcohol or the like generated along the hydrolysis of the raw material monomer such as an alkyltrialkoxysilane at the time of producing the organo polysiloxane (a) or the organo polysiloxane (b), water in the water-dispersed type colloidal silica, which is not involved in the hydrolytic reaction, and, in a case where an organic solvent-dispersed type colloidal silica is used, such a dispersing organic solvent.

Further, in the hard coating composition of the present invention, a solvent other than the alcohol which can be mixed with water/alcohol, may be used in combination as a solvent other than the above described solvent, and as such a solvent, a ketone such as acetone or acetyl acetone; an ester such as ethyl acetate or isobutyl acetate, or an ether such as propylene glycol monomethyl ether, dipropylene glycol monomethyl ether or diisopropyl ether may be mentioned.

The amount of the solvent to be used in the hard coating composition of the present invention is preferably from 50 to 3,000 parts by mass, more preferably from 150 to 2,000 parts by mass, per 100 parts by mass of the total non-volatile component in the hard coating composition.

The hard coating composition of the present invention has the above-described composition, whereby it has been made possible to impart excellent abrasion resistance and weather resistance to a cured coating film obtainable by curing it. Further, the cured coating film by the hard coating composition of the present invention becomes a useful hard coating layer, when it is formed on a resin substrate.

As an index to evaluate the hard coating composition of the present invention, the tensile stress ($\sigma$) of a cured coating film thereby obtainable, as obtained by the following method, is used, in addition to a usual evaluation.

In this specification, the tensile stress ($\sigma$) of the cured coating film to be used as an index to evaluate the hard coating composition is specifically a stress value calculated by the following formula (1) by using the values of the radius of curvature of a silicon wafer before and after forming the cured film and the value of the thickness of the cured coating film (after curing), as measured by a thin film stress measuring apparatus at an ambient temperature of 25° C. Further, the measuring procedure will be described in detail in Examples.

$$\sigma = \frac{E \cdot h^2}{(1-v) \cdot 6 \cdot R \cdot t} \quad (1)$$

(wherein R is a difference (Rb−Ra) [m] between the radius of curvature (Rb) of a silicon wafer element as measured at an ambient temperature of 25° C. by a thin film stress measuring apparatus and the radius of curvature (Ra) of a silicon wafer sample having on its surface a cured coating film formed by curing the hard coating composition as a test specimen under conditions of 120° C. for 1 hour, E/(1−v) is a biaxial elastic coefficient (crystal face (100): $1.805 \times 10^{11}$ Pa) as calculated from the elastic modulus E of the silicon wafer and the Poisson's ratio v, h is the thickness [m] of the silicon wafer, and t is the thickness [m] of the cured coating film.)

Usually, a resin substrate coated with a hard coating composition containing curable organo polysiloxanes, is, after drying and removing a solvent contained in the hard coating composition, heated under a temperature condition of from ordinary temperature to less than the heat deformation temperature of the resin substrate, whereby the heat curable organo polysiloxanes in the hard coating composition are heat-cured to form a cured coating film, thereby to obtain the resin substrate having a hard coating layer. In the process for such heat curing, in the heat-curable organo polysiloxanes contained in the hard coating composition, silanol groups (—Si—OH) therein undergo a dehydration condensation reaction with one another to form siloxane bonds (—Si—O—Si), thereby to form a cured coating film excellent in the abrasion resistance.

In the temperature raising process to dry and cure the hard coating composition, the gel film (coating film) is densified by the capillary force generated by evaporation of the solvent and by the above dehydration condensation reaction which proceeds in the coating film, whereby the volume reduction ratio reaches a few tens %. The gel film is not a completely elastic body, but if it is approximated to be an elastic body, when the coating film shrinks by curing in a state restrained in an in-plane direction by the resin substrate, a strain will be accumulated in the in-plane direction of the coating film. As a result, a tensile stress will be formed in the in-plane direction of the cured coating film thereby obtainable. As such a tensile stress becomes large, the cured coating film is likely to undergo cracking or delamination from the resin substrate.

In this specification, the tensile stress was quantified by the above formula (1) and used for an evaluation of the hard coating composition. As shown by the above formula (1), the difference R in the radius of curvature of a silicon wafer between before and after forming a cured coating film is determined by the thickness h of the silicon wafer, the elastic modulus E of the silicon wafer, the Poisson's ratio v of the silicon wafer, the thickness t of the cured coating film and the tensile stress ($\sigma$). If a tensile stress ($\sigma$) is formed in the in-plane direction of the cured coating film formed on one side of the silicon wafer, as is evident from the above formula (1), the difference R in the radius of curvature becomes large, i.e. the warpage of the silicon wafer being the substrate for the cured coating film becomes large, as the stress ($\sigma$) formed in the in-plane direction of the cured coating film is large.

Thus, if the radii of curvature Rb and Ra of a silicon wafer before and after forming the cured coating film, and the thickness t of the cured coating film are investigated, the tensile stress ($\sigma$) of the cured coating film can be obtained. Here, the radius of curvature Ra of the silicon wafer having a cured coating film formed thereon can be obtained by forming the cured coating film under the above curing conditions on one side of a single crystal silicon wafer, scanning with a laser beam on a wafer surface having the cured coating film formed, by using a thin film stress measuring apparatus, and reading out Ra from the direction of reflected light.

The radius of curvature Ra of a silicon wafer after forming the above cured coating film may take various values depending upon the type of the hard coating composition and the curing conditions, etc. to be used for forming the cured coating film. That is, depending upon the type of the hard coating composition and the curing conditions, etc. to be used for forming the cured coating film, the tensile stress ($\sigma$) of the cured coating film as calculated by the above formula (1) may take various values. Therefore, by setting the conditions for curing the cured coating film to be specific conditions, it is possible to evaluate the hard coating composition by the tensile stress ($\sigma$) of the cured coating film. In the above formula (1), 120° C. and 1 hour are used as curing conditions for the cured coating film. Under such curing conditions, irrespective of the type of the hard coating composition, it can be said that heat curing has been completed i.e. substantially all silanol groups have disappeared by dehydration condensation, and siloxane bonds are formed.

With respect to the hard coating composition of the present invention, the tensile stress value is calculated by the above formula (1). The tensile stress ($\sigma$) of a cured coating film obtained by using it is preferably at most 31 MPa. With such a hard coating composition that the tensile stress ($\sigma$) becomes at most 31 MPa, by using it to form a hard coating layer made of a cured coating film on the surface of a resin substrate, it is possible to prevent formation of cracks in the hard coating layer formed on the surface of the resin substrate and to sufficiently suppress delamination of the hard coating layer from the resin substrate. As a result, it is possible to obtain a resin substrate having a hard coating layer excellent in weather resistance.

Here, with respect to the hard coating composition of the present invention, the tensile stress value is calculated by the above formula (1). If the tensile stress ($\sigma$) of the cured coating film obtainable by using it exceeds 31 MPa, cracks are likely to be formed in the hard coating layer formed on the surface of a resin substrate by using such a hard coating composition, or the hard coating layer is likely to be peeled from the resin substrate. Further, in the case of a molded product having a curved shape such as a vehicle window if a resin molded product having a residual stress is used as a resin substrate, cracking so-called crazing is likely to be formed in the resin substrate as the resin is not durable against the tensile stress of the hard coating layer. Further, in a case where a resin substrate having a hard coating layer is attached to a vehicle as a vehicle window, if the resin substrate is deflected by e.g. wind pressure, cracks are likely to be formed in the hard coating layer formed on the surface of the resin substrate. The upper limit value of the tensile stress ($\sigma$) is preferably 30 MPa, particularly preferably 28 MPa. Further, as the lower limit of the tensile stress ($\sigma$), 1 MPa is suitable, 10 MPa is preferred, and 20 MPa is particularly preferred.

[Resin Substrate having Hard Coating Layer of the Present Invention]

The resin substrate having a hard coating layer of the present invention can be prepared by applying the hard coating composition of the present invention on the after-described resin substrate to form a coating film and curing the curable compounds in the coating film to form a hard coating layer. The method for applying the hard coating composition is not particularly limited and may, for example, be a usual coating method such as a spray coating method, a dip coating method or a flow coating method. It is preferred to suitably adjust the viscosity, the solid content concentration, etc. of the hard coating composition depending upon the coating method.

The hard coating composition applied to the resin substrate is usually, after drying and removing the solvent under a temperature condition of from ordinary temperature to less than the heat deformation temperature of the resin substrate, heat-cured. Such a heat curing reaction is preferably carried out at a high temperature within a range where there will be no problem with respect to the heat resistance of the resin substrate, whereby curing can be completed quickly. However, for example, in a case where an organo polysiloxane having a methyl group as a monovalent organic group is used, if the temperature during the heat curing is 250° C. or higher, the methyl group will be detached by heat decomposition, such being undesirable. Therefore, the curing temperature is preferably from 50 to 200° C., more preferably from 80 to 160° C., particularly preferably from 100° C. to 140° C. The curing time is preferably from 10 minutes to 4 hours, more preferably from 20 minutes to 3 hours, particularly preferably from 30 minutes to 2 hours.

The thickness (the thickness before curing) of a coating film formed by applying the hard coating composition on the surface of a resin substrate, depends on the solid content concentration in the composition. It is preferably suitably adjusted, for example, by taking the solid content concentration into consideration, so that the film thickness after curing will be within the predetermined range.

The thickness of the hard coating layer formed on the resin substrate is preferably from 0.1 μm to 20 μm, more preferably from 1 μm to 10 μm, particularly preferably from 2 μm to 10 μm, in its state after curing. If the thickness of the hard coating layer is too thin, it becomes difficult to secure sufficient abrasion resistance even when the hard coating composition of the present invention is employed. On the other hand, if the thickness of the hard coating layer is too thick, cracking or delamination is likely to occur. Accordingly, in order to prevent cracking or delamination while securing sufficient abrasion resistance, the thickness of the hard coating layer is preferably from 0.1 μm to 20 μm.

The resin substrate having a hard coating layer of the present invention thus obtained is useful as a window glass for building material to be attached to buildings, since the coating film made of the hard coating layer has excellent abrasion resistance and weather resistance.

Further, the resin substrate having a hard coating layer of the present invention may also be employed for so-called "use in a bent state" wherein the resin substrate in a flat plate form is bent to have a prescribed radius of curvature by forcible bending at ordinary temperature so-called cold forming, and also in such a case, it has durability against bending, and it is possible to sufficiently prevent cracking in the hard coating layer, or formation of gathering of very fine cracks (crazing) in the resin substrate.

That is, the present invention provides a resin substrate having a hard coating layer, which is in a flat plate form and which is capable of being sufficiently employed for such use in a bent form at ordinary temperature. Here, ordinary temperature is usually meant for normal temperature without being heated or cooled, and in this specification, a temperature range of from about 0 to 80° C. is referred to as "ordinary temperature". Here, the bending range in which the resin substrate having a hard coating layer of the present invention can be used in the use in a bent state at ordinary temperature, is up to a bending condition where the resin substrate on which a hard coating layer is to be formed may be subjected to forcible bending at ordinary temperature, specifically, up to a bending condition of at least the allowable radius of curvature of the resin substrate. Here, the allowable radius of curvature is a value for an index to show how much the resin substrate may be bent for the use in a bent state, and it is determined by the type of the resin constituting the resin substrate and the thickness of the resin substrate. For example, in a case where the resin substrate is made of a polycarbonate resin, the allowable radius of curvature is represented by R=180t (where t is the thickness [mm] of the resin substrate).

Further, in a case where the resin substrate having a hard coating layer of the present invention is to be employed for the use in a bent state as mentioned above, the thickness of the hard coating layer formed on the resin substrate is preferably from 0.1 µm to 6 µm, more preferably from 0.1 µm to 5 µm, particularly preferably from 0.1 µm to 4 µm in its state after curing. In a case where the resin substrate having a hard coating layer of the present invention is used under the above bending conditions i.e. under the bending conditions of at least the allowable radius of curvature of the resin substrate in a temperature range of from 0 to 80° C., if the thickness of the hard coating layer is less than 0.1 µm, the hard coating film may be peeled from the resin substrate, and if it exceeds 6 µm, cracking may form in the hard coating layer during the bending or during the use in a bent state.

In the resin substrate having a hard coating layer of the present invention, in order to further improve the abrasion resistance or film strength, a top coating layer containing $SiO_2$ as the main component may be applied on the hard coating layer of the above resin substrate having the hard coating layer. As the method for forming such a top coating layer containing $SiO_2$ as the main component, a method of applying a poly(perhydro)silazane on the above hard coating layer, followed by curing, or method of vapor deposition, sputtering or the like, may preferably be used.

<Resin Substrate>

The resin as the material for the resin substrate to be used in the present invention may, for example, be a polycarbonate resin, a polystyrene resin, an aromatic polyester resin, an acrylic resin, a polyester resin, a polyarylate resin, a polycondensation product of a halogenated bisphenol A and ethylene glycol, an acryl urethane resin, or a halogenated aryl group-containing acrylic resin.

Among them, a polycarbonate resin such as an aromatic polycarbonate resin, or an acrylic resin such as a polymethyl methacrylate type acrylic resin, is preferred, and a polycarbonate resin is more preferred. Further, among polycarbonate resins, a bisphenol A type polycarbonate resin is particularly preferred. Further, the resin substrate may contain two or more types of the above mentioned thermoplastic resins, or may be a laminated substrate having two or more layers laminated by using such resins. Further, the shape of the resin substrate is not particularly limited, and it may be a flat plate or curved. Further, the color of the resin substrate is preferably colorless transparent, or colored and transparent.

Further, in a case where the resin substrate having a hard coating layer of the present invention is one to be used under the bending conditions of at least the allowable radius of curvature of the resin substrate within the above mentioned temperature range of from 0 to 80° C., the shape of the resin substrate is a flat plate. As the resin being the material for the resin substrate, a polycarbonate resin is preferred from the viewpoint of the allowable radius of curvature. Further, the thickness of the resin substrate is preferably from 1 to 200 mm, more preferably from 1 to 50 mm.

<Primer Layer>

The resin substrate having a hard coating layer of the present invention may have a primer layer between the resin substrate and the above hard coating layer, and for improvement of the adhesion between the resin substrate and the hard coating layer, it preferably has such a primer layer. The primer layer is not particularly limited, but in the present invention, it is preferably formed by applying a primer composition comprising an acrylic polymer, an ultraviolet absorber and a solvent, on a resin substrate, followed by drying.

As such an acrylic polymer, a homopolymer made of at least one member selected from an acrylic acid ester and a methacrylic acid ester each having an alkyl group having at most 6 carbon atoms as "the main monomer" (specifically from 90 to 100 mol % based on the entire raw material monomers, the same applies hereinafter), or a copolymer of such monomers, is preferred. Further, a copolymer of the above mentioned main monomer with at least one member of other acrylic acid esters and methacrylic acid esters, is also preferred. Such other monomers may, for example, be acrylic acid esters or methacrylic acid esters having an alkyl group having at least 7 carbon atoms or a cycloalkyl group having at most 12 carbon atoms. Further, it is also possible to use a copolymer obtainable by copolymerizing, together with such a monomer, a small amount of an acrylic acid ester or a methacrylic acid ester having a functional group-containing alkyl group (such as a hydroxyalkyl group). The above cycloalkyl group may, for example, be a cyclohexyl group, a 4-methylcyclohexyl group, a 4-t-butylcyclohexyl group, an isobornyl group, a dicyclopentanyl group or a dicyclopentenyloxyethyl group.

Among them, a polymer obtainable by polymerizing one or more members selected from methacrylic acid alkyl esters as the main monomer units, is preferred as the acrylic polymer to be used in the present invention. Further, a homopolymer or copolymer obtainable by polymerizing one or more members of methacrylic acid alkyl esters having an alkyl group having at most 6 carbon atoms, selected from methyl methacrylate, n-butyl methacrylate, tert-butyl methacrylate, ethyl methacrylate and isobutyl methacrylate, is preferred. More preferred is a homopolymer of methyl methacrylate, tert-butyl methacrylate, ethyl methacrylate or the like, or a copolymer with one or more types selected from methyl methacrylate, n-butyl methacrylate, ethyl methacrylate and isobutyl methacrylate.

Further, it is also possible to employ an acrylic polymer obtained by polymerizing or copolymerizing at least one member selected from acrylic monomers having a hydrolyzable silyl group and/or a SiOH group bonded via a C—Si bond.

Such acrylic monomers may, for example, be 3-methacryloyloxypropyltrimethoxysilane, 3-methacryloyloxypropylmethyldimethoxysilane, 3-methacryloyloxypropyldimethylmethoxysilane, 3-methacryloyloxypropyltriethoxysilane, 3-methacryloyloxypropylmethyldiethoxysilane, 3-acryloyloxypropyltrimethoxysilane, 3-acryloyloxypropylmethyldimethoxysilane, etc.

Further, such acrylic polymers to be used for forming a primer layer preferably have a weight average molecular weight of at least 20,000, more preferably at least 50,000 and preferably at most 1,000,000. An acrylic polymer having a weight average molecular weight within this range is preferred since the performance such as the adhesion or strength as a primer layer can be sufficiently provided.

The primer layer may contain an ultraviolet absorber in order to prevent yellowing of the resin substrate. As the ultraviolet absorber, the same one as the above described ultraviolet absorber contained in the hard coating composition of the present invention may be employed. One of such ultraviolet absorbers may be used alone, or two or more of them may be used in combination. The content of the ultraviolet absorber in the primer layer is preferably from 1 to 50 parts by mass, particularly preferably from 1 to 30 parts by mass, per 100 parts by mass of the resin component such as the acrylic polymer, etc.

The primer layer may further contain a photostabilizer or the like. The photostabilizer may, for example, be a hindered amine; or a nickel complex such as nickel bis(octylphenyl) sulfide, nickel complex-3,5-di-tert-butyl-4-hydroxybenzyl phosphoric acid monoethylate or nickel dibutyl dithiocarbonate. Two or more of them may be used in combination. The content of the photostabilizer in the primer layer is preferably from 0.1 to 50 parts by mass, particularly preferably from 0.5 to 10 parts by mass, per 100 parts by mass of the resin component such as the acrylic polymer, etc.

A solvent is usually contained in the primer composition to be used for forming the primer layer. The solvent is not particularly limited so long as it is a solvent capable of stably dissolving the acrylic polymer. Specifically, it may, for example, be a ketone such as acetone, methyl ethyl ketone, methyl isobutyl ketone or cyclohexanone; an ether such as tetrahydrofuran, 1,4-dioxane or 1,2-dimethoxyethane; an ester such as ethyl acetate, butyl acetate or methoxyethyl acetate; an alcohol such as methanol, ethanol, 1-propanol, 2-propanol, 1-butanol, 2-butanol, 2-methyl-1-propanol, 2-methoxyethanol, 4-methyl-2-penanol, 2-buthoxyethanol, 1-methoxy-2-propanol or diacetone alcohol; a hydrocarbon such as n-hexane, n-heptane, isooctane, benzene, toluene, xylene, gasoline, light oil or kerosene; acetonitrile, nitromethane or water. Two or more of them may be used in combination.

The amount of the solvent is preferably from 50 to 10,000 pars by mass, particularly preferably from 100 to 10,000 parts by mass, per 100 parts by mass of the resin component such as the acrylic polymer, etc. Further, the content of the non-volatile component (solid content) in the primer composition is preferably from 0.5 to 75 mass %, particularly preferably from 1 to 40 mass %, based on the total amount of the composition.

The above primer composition may further contain additives such as a leveling agent, a defoaming-agent, a viscosity-adjusting agent, etc.

The method for applying the primer composition on the resin substrate is not particularly limited, but a spray coating method, a dip coating method or a flow coating method may, for example, be mentioned. Further, the heating conditions for drying are not particularly limited, but they are preferably from 50 to 140° C. for from 5 minutes to 3 hours.

With respect to a primer layer to be formed on the resin substrate by using the above primer composition, if the thickness of the primer layer is too thin, the effect to improve the adhesion between the resin substrate and the hard coating layer is likely to be inadequate, and therefore, it may be a thickness required to maintain the necessary amount of the above additives, while sufficiently bonding the resin substrate and the hard coating layer. Such a thickness of the primer layer is preferably from 0.1 μm to 10 μm, particularly preferably from 2 μm to 5 μm.

In a case where the resin substrate having the hard coating layer of the present invention has a primer layer, on the primer layer thus formed, a hard coating layer is formed in the same manner as described above, whereby the resin substrate having the hard coating layer of the present invention can be produced.

The resin substrate having the hard coating layer of the present invention thus obtained, is excellent in the weather resistance and abrasion resistance. With respect to the abrasion resistance, specifically, when the resin substrate having the hard coating layer of the present invention is subjected to a Taber abrasion test wherein in accordance with JIS K5600 (5.9), a truck wheel with a load of 500 g is rotated 500 times against the surface of the hard coating layer, the increase in the haze after the test against the haze before the test is preferably at most 20%.

EXAMPLES

Now, the present invention will be described in further detail with reference to Examples, but it should be understood that the present invention is by no means restricted by these Examples. Here, Examples 1 to 34 are working Examples of the present invention, and Examples 35 to 51 are Comparative Examples. Further, in Examples, evaluations of organo polysiloxanes were carried out with respect to the following items and by the following methods.

(1) Number (B) of Hydroxy Groups Bonded to Silicon Atoms/Number (A) of Alkoxy Groups Bonded to Silicon Atoms Organo polysiloxanes used in the following Examples were only those having methoxy groups bonded to silicon atoms ($SiO-CH_3$) as alkoxy groups bonded to silicon atoms, and therefore, as the above (B)/(A), a ratio of $Si-OH/SiO-CH_3$ obtained by the following method, was used.

Using an infrared absorption analyzer (FT-IR, model: Avatar/Nicolet FT-IR360, manufactured by Thermo Fisher Scientific K. K.), the ratio of $Si-OH/SiO-CH_3$ was obtained from the area ratio of the absorption attributable to $SiO-CH_3$ in the vicinity of 2,860 $cm^{-1}$ and the absorption attributable to $Si-OH$ in the vicinity of 900 $cm^{-1}$.

(2) Analyses of Bonding States of Silicon Atoms in Organo Polysiloxanes

The bonding states of silicon atoms in organo polysiloxanes, specifically, the abundance ratios of M units, D units, T units and Q units, and the abundance ratios of T0 to T3, were respectively obtained from the peak area ratios of $^{29}$Si-NMR by means of a nuclear magnetic resonance analyzer ($^{29}$Si-NMR: ECP400 manufactured by JEOL Ltd.). The measuring conditions are such that a 10 mmΦ test tube made of a polytetrafluoroethylene is used, the probe is T10, the resonant frequency is 79.42 MHz, the pulse width is 10 μsec, the waiting time is 20 sec, the cumulated number is 1,500 times, the relaxation agent contains 0.1 mass % of Cr $(acac)_3$, and the external standard sample is tetramethylsilane. Further, the chemical shifts of $^{29}$Si-NMR attributable to the respective structures are as follows, in the case of a methyl type organo polysiloxane.

(M Units to Q Units)
  M units: 15 to 5 ppm,
  D units: −15 to −25 ppm,
  T units: −35 to −75 ppm,
  Q units: −90 to −130 ppm.
(T0 to T3)
  T0: −40 to −41 ppm,
  T1: −49 to −50 ppm,
  T2: −57 to −59 ppm,
  T3: −66 to −70 ppm.

(3) Number Average Molecular Weight Mn, Weight Average Molecular Weight Mw and Dispersivity Mw/Mn They were obtained by means of gel permeation chromatography (GPC, Waters 2695 manufactured by Waters Corporation, RI detection, column: Styragel guard colum+HR1+HR4+HR5E, eluent: chloroform).

[1] Synthesis of Organo Polysiloxane (a)

Example 1

Into a 0.2 L flask, a methyl type silicone resin KR-220L (tradename, manufactured by Shin-Etsu Chemical Co., Ltd., Si—OH/SiO—CH$_3$=11.7, the abundance ratios of the respective T units are T0:T1:T2:T3=ND:ND:28:72, Mn=1,200, Mw=4,720, Mw/Mn=3.93) (10 g) and 1-butanol (10 g) were added and thoroughly stirred, and acetic acid (10 g) and ion-exchanged water (10 g) were added and further thoroughly stirred. The obtained solution was stirred at 25° C. for one hour to obtain an organo polysiloxane (a) "MSi-1". This solution containing MSi-1 (MSi-1 concentration: 25 mass %) was used as it was for the after-described [3] Preparation of hard coating composition.

With respect to the obtained MSi-1, a comparison with KR-220L being the raw material was carried out by means of FT-IR, whereby a decrease of the peak attributable to SiO—CH$_3$ groups and an increase of the peak attributable to Si—OH groups were confirmed. The ratio of Si—OH/SiO—CH$_3$ in MSi-1 obtained from the peak area ratio of FT-IR was 18.4. MSi-1 was constituted by T units, and the abundance ratios of the respective T units obtained from the chemical shifts of $^{29}$Si-NMR were T0:T1:T2:T3=ND:0.9:27.6:71.5. Further, Mn of MSi-1 was 1,200, Mw was 4,720, and Mw/Mn was 3.93.

Example 2

In the same manner as in Example 1 except that the reaction temperature was changed to 40° C., a solution containing an organo polysiloxane (a) "MSi-2" (MSi-2 concentration: 25 mass %) was obtained. This solution was used as it was for the after-described [3] Preparation of hard coating composition.

With respect to the obtained MSi-2, a comparison with KR-220L being the raw material was carried out by means of FT-IR, whereby a decrease of the peak attributable to SiO—CH$_3$ groups and an increase of the peak attributable to Si—OH groups were confirmed. The ratio of Si—OH/SiO—CH$_3$ in MSi-2 obtained from the peak area ratio of FT-IR was 58.7. MSi-2 was constituted by T units, and the abundance ratios of the respective T units obtained from the chemical shifts of $^{29}$Si-NMR were T0:T1:T2:T3=ND:trace:25.1:74.6. Further, Mn of MSi-2 was 1,230, Mw was 4,160, and Mw/Mn was 3.38.

Example 3

In the same manner as in Example 1 except that the reaction temperature was changed to 70° C., a solution containing an organo polysiloxane (a) "MSi-3" (MSi-3 concentration: 25 mass %) was obtained. This solution was used as it was for the after-described [3] Preparation of hard coating composition.

With respect to the obtained MSi-3, a comparison with KR-220L being the raw material was carried out by means of FT-IR, whereby a decrease of the peak attributable to SiO—CH$_3$ groups and an increase of the peak attributable to Si—OH groups were confirmed. The ratio of Si—OH/SiO—CH$_3$ in this MSi-3 obtained from the peak area ratio of FT-IR was 40.6. MSi-3 was constituted by T units, and the abundance ratios of the respective T units obtained from the chemical shifts of $^{29}$Si-NMR were T0:T1:T2:T3=ND:trace:22.8:77.0. Further, Mn of MSi-3 was 1,140, Mw was 3,750, and Mw/Mn was 3.28.

Example 4

An organo polysiloxane (a) "MSi-5" was obtained in the same manner as in Example 1 except that KR-220L being the raw material was changed to a methyl type silicone resin KR-500 (manufactured by Shin-Etsu Chemical Co., Ltd., no peak attributable to Si—OH groups was confirmed by FT-IR, substantially only SiO—CH$_3$; the abundance ratios of the respective T units were T0:T1:T2:T3=ND:15:58:27, Mn=700, Mw=1,240, and Mw/Mn=1.77). This solution containing MSi-5 (MSi-5 concentration: 25 mass %) was used as it was for the after-described [3] Preparation of hard coating composition.

With respect to the obtained MSi-5, a comparison with KR-500 being the raw material was carried out by means of FT-IR, whereby a decrease of the peak attributable to SiO—CH$_3$ groups and an appearance of the peak attributable to Si—OH groups were confirmed. The ratio of Si—OH/SiO—CH$_3$ in MSi-5 obtained from the peak area ratio of FT-IR was 41.0. MSi-5 was constituted by T units, and the abundance ratios of the respective T units obtained from the chemical shifts of $^{29}$Si-NMR were T0:T1:T2:T3=ND:1.1:30.1:68.8. Mn of MSi-5 was 520, Mw was 1,150, and Mw/Mn was 2.22.

Example 5

In the same manner as in Example 4 except that the reaction temperature was changed to 70° C., a solution containing an organo polysiloxane (a) "MSi-6" (MSi-6 concentration: 25 mass %) was obtained. This solution was used as it was for the after-described [3] Preparation of hard coating composition.

With respect to the obtained MSi-6, a comparison with KR-500 as the raw material was carried out by means of FT-IR, whereby a decrease of the peak attributable to SiO—CH$_3$ groups and an appearance of the peak attributable to Si—OH groups were confirmed. The ratio of Si—OH/SiO—CH$_3$ in MSi-6 obtained from the peak area ratio of FT-IR was 39.2. MSi-6 was constituted by T units, and the abundance ratios of the respective T units obtained from the chemical shifts of $^{29}$Si-NMR were T0:T1:T2:T3=ND:0.8:28.9:70.3. Mn of MSi-6 was 490, Mw was 1,120, and Mw/Mn was 2.28.

Example 35

An organo polysiloxane "MSi-4" was obtained in the same manner as in Example 1 except that KR-220L being the raw material was changed to a methyl type silicone resin KR-500 (manufactured by Shin-Etsu Chemical Co., Ltd., no peak attributable to Si—OH groups was confirmed by FT-IR, substantially only SiO—CH$_3$; the abundance ratios of the respective T units were T0:T1:T2:T3=ND:15:58:27, Mn=700, Mw=1,240, and Mw/Mn=1.77). This solution containing MSi-4 (MSi-4 concentration: 25 mass %) was used as it was for the after-described [3] Preparation of hard coating composition.

With respect to the obtained MSi-4, a comparison with KR-500 being the raw material was carried out by means of FT-IR, whereby a decrease of the peak attributable to SiO—CH$_3$ groups and an appearance of the peak attributable to Si—OH groups were confirmed. The ratio of Si—OH/SiO—CH$_3$ in MSi-4 obtained from the peak area ratio of FT-IR was 15.3. MSi-4 had a bonding structure composed mainly of T units, and the abundance ratios of the respective T units obtained from the chemical shifts of $^{29}$Si-NMR were T0:T1:T2:T3=ND:15.1:59.0:25.8, and thus T1:T2:T3 was outside the range of the organo polysiloxane (a) of the present invention. Mn of MSi-4 was 590, Mw was 1,120, and Mw/Mn was 1.90.

Example 36

A methyl type silicone resin KR-220L (manufactured by Shin-Etsu Chemical Co., Ltd., Si—OH/SiO—CH$_3$=11.7, the abundance ratios of the respective T units were T0:T1:T2:T3=ND:ND:28:72, Mn=1,200, Mw=4,720, and Mw/Mn=3.93) is an organo polysiloxane wherein Si—OH/SiO—CH$_3$ is outside the range of the organo polysiloxane (a) of the present invention. This KR-220L was used as the organo polysiloxane in Example 36, and employed for the following [3] Preparation of hard coating composition.

Example 37

A methyl type silicone resin KR-500 (manufactured by Shin-Etsu Chemical Co., Ltd., no peak attributable to Si—OH groups was confirmed by FT-IR, substantially only SiO—CH$_3$; the abundance ratios of the respective T units were T0:T1:T2:T3=ND:15:58:27, Mn=700, Mw=1,240, and Mw/Mn=1.77) is an organo polysiloxane wherein both Si—OH/SiO—CH$_3$ and T1:T2:T3 are outside the ranges of the organo polysiloxane (a) of the present invention, and this KR-500 was used as the organo polysiloxane in Example 37 and employed for the following [3] Preparation of hard coating composition.

The structural characteristics of the organo polysiloxanes in the respective Examples thus obtained, are summarized in Table 1.

[2] Synthesis of Organo Polysiloxane (b) (PSi-1) and Preparation of Organo Polysiloxane (b) Composition Solution Into a 1 L flask, 200 g of aqueous colloidal silica having an average particle size of about 15 nm (pH 3.1, fine silica particle solid content: 35 mass %) and 0.2 g of acetic acid were charged, and 138 g methyltrimethoxysilane was added. After stirring for one hour, the pH of the composition was stabilized at 4.5. This composition was aged at 25° C. for 4 days to ensure the partial hydrolytic condensation in the silica/methanol aqueous dispersion.

In this composition, the non-volatile component was 40 mass %, and the obtained organo polysiloxane (hereinafter referred to as the organo polysiloxane (b) "PSi-1") had bond structures composed mainly of T units (number of T units: total number of M units, D units and Q units=100:0), and the abundance ratios of the respective T units obtained from the chemical shifts of $^{29}$Si-NMR were T0:T1:T2:T3=ND:2:54:44. In the obtained organo polysiloxane, monomer-form T0 [R—Si(OH)$_3$] (wherein R is a monovalent organic group) was not substantially present, and it was confirmed that the starting material methyltrimethoxysilane was substantially completely converted to an oligomer-form organo polysiloxane. Mn of the obtained organo polysiloxane (b) PSi-1 was 400, Mw was 670, and Mw/Mn was 1.68. As reference example, various structural characteristics of the organo polysiloxane (b) PSi-1 are shown in the lowest section in Table 1.

To 100 parts by mass of the organo polysiloxane (b) PSi-1 solution obtained as described above (containing fine silica particles (c)), 4 parts by mass of a benzophenone type ultraviolet absorber was added, followed by aging at 25° C. for at least 24 hours. By using 1-butanol and isopropanol as diluting solvents, an organo polysiloxane (b) PSi-1 composition solution having 25 mass % of a non-volatile component (150° C., 45 minutes) and a viscosity of 4.4 mPa·s was prepared.

[3] Preparation and Evaluation of Hard Coating Compositions

Examples 6 to 15

Preparation of Hard Coating Compositions HC-1 to HC-6 and HC-8 to HC-11

To the solutions containing the organo polysiloxanes (a) of Examples 1 to 5 obtained in the above [1] i.e. organo polysiloxane (a) MSi-1 to MSi-3, MSi-5 and MSi-6, respectively, the organo polysiloxane (b) PSi-1 composition solu-

TABLE 1

| | Abbreviated name of organo polysiloxane | SiOH/ SiOCH$_3$ | T0 | T1 | T2 | T3 | T3/T2 | Mn | Mw | Mw/Mn |
|---|---|---|---|---|---|---|---|---|---|---|
| Ex. 1 | MSi-1 | 18.4 | ND | 0.9 | 27.6 | 71.5 | 2.6 | 1,200 | 4,720 | 3.93 |
| Ex. 2 | MSi-2 | 58.7 | ND | trace | 25.1 | 74.6 | 3.0 | 1,230 | 4,160 | 3.38 |
| Ex. 3 | MSi-3 | 40.6 | ND | trace | 22.8 | 77.0 | 3.4 | 1,140 | 3,750 | 3.28 |
| Ex. 4 | MSi-5 | 41.0 | ND | 1.1 | 30.1 | 68.8 | 2.3 | 520 | 1,150 | 2.22 |
| Ex. 5 | MSi-6 | 39.2 | ND | 0.8 | 28.9 | 70.3 | 2.4 | 490 | 1,120 | 2.28 |
| Ex. 35 | MSi-4 | 15.3 | ND | 15.1 | 59.0 | 25.8 | 0.4 | 590 | 1,120 | 1.90 |
| Ex. 36 | KR-220L | 11.7 | ND | ND | 28.0 | 72.0 | 2.6 | 1,200 | 4,720 | 3.93 |
| Ex. 37 | KR-500 | 0 | ND | 15.0 | 58.0 | 27.0 | 0.4 | 700 | 1,240 | 1.77 |
| Ref. Ex. | PSi-1 Organo polysiloxane (b) | — | ND | 2.0 | 54.0 | 44.0 | 0.8 | 400 | 670 | 1.68 |

In Table, "ND" represents an amount not detectable, and "trace" represents a trace amount of from 0.01 to 0.25.

tion obtained in the above [2] was blended in the amount (mass %) as shown in Table 2 and thoroughly mixed to obtain hard coating compositions HC-1 to HC-6 and HC-8 to HC-11 (Examples 6 to 15).

After the measurement, the silicon wafer was taken out, and by using a spin coating method, the hard coating composition HC-1 obtained in the above Example 6 was applied on the silicon wafer and then heated and cured at

TABLE 2

| | Abbreviated name of hard coating composition | PSi-1 solution (mass %) | Solid content in PSi-1 solution (mass %) | | | Organo polysiloxane (a) solution (mass %) | Solid content: organo polysiloxane (a) (mass %) | | | | | Molecular weight ratio (b)/(a) |
|---|---|---|---|---|---|---|---|---|---|---|---|---|
| | | | Organo polysiloxane (b) PSi-1 | Silica particles | Ultraviolet absorber | | Ex. 1 MSi-1 | Ex. 2 MSi-2 | Ex. 3 MSi-3 | Ex. 4 MSi-5 | Ex. 5 MSi-6 | |
| Ex. 6 | HC-1 | 80 | 13.4 | 5.8 | 0.8 | 20 | 5 | — | — | — | — | 0.14 |
| Ex. 7 | HC-2 | 95 | 16.0 | 6.8 | 0.95 | 5 | — | 1.25 | — | — | — | 0.16 |
| Ex. 8 | HC-3 | 90 | 15.1 | 6.5 | 0.9 | 10 | — | 2.5 | — | — | — | 0.16 |
| Ex. 9 | HC-4 | 80 | 13.4 | 5.8 | 0.8 | 20 | — | 5 | — | — | — | 0.16 |
| Ex. 10 | HC-5 | 75 | 12.6 | 5.4 | 0.75 | 25 | — | 6.25 | — | — | — | 0.16 |
| Ex. 11 | HC-6 | 80 | 13.4 | 5.8 | 0.8 | 20 | — | — | 5 | — | — | 0.18 |
| Ex. 12 | HC-8 | 95 | 16.0 | 6.8 | 0.95 | 5 | — | — | — | 1.25 | — | 0.58 |
| Ex. 13 | HC-9 | 90 | 15.1 | 6.5 | 0.9 | 10 | — | — | — | 2.5 | — | 0.58 |
| Ex. 14 | HC-10 | 80 | 13.4 | 5.8 | 0.8 | 20 | — | — | — | 5 | — | 0.58 |
| Ex. 15 | HC-11 | 80 | 13.4 | 5.8 | 0.8 | 20 | — | — | — | — | 5 | 0.60 |

Examples 38 to 41

To the solutions of the organo polysiloxanes of Examples 35 to 37 obtained in the above [1] i.e. the solution containing the organo polysiloxane MSi-4, the methyl type silicone resin KR-220L/1-butanol solution (concentration: 25 mass %) and the methyl type silicone resin KR-500/1-butanol solution (concentration: 25 mass %), the organo polysiloxane (b) PSi-1 composition solution obtained in the above [1] was blended in the amount (mass %) as shown in Table 3 and thoroughly mixed to obtain hard coating compositions HC-7, HC-13 and HC-14 (Examples 38, 40 and 41). Further, the organo polysiloxane (b) PSi-1 composition solution obtained in the above [1] was designated as HC-12 (Example 39).

120° C. for one hour to form a cured coating film. The thickness of the cured coating film formed on the silicon wafer was measured by means of an interference film thickness measuring apparatus Solid Lambda Thickness (manufactured by Spectra Co-op) under a condition of a refractive index of 1.46 and found to be 2.2 μm.

Here, the curing conditions were determined by confirming the disappearance of the absorption peak by silanol groups in the vicinity of a wave number of 910 cm$^{-1}$ by using a total reflection method by means of an infrared absorption spectrum measuring apparatus (Avatar/Nicolet FT-IR360, manufactured by Thermo Fisher Scientific K.K.).

With respect to the silicon wafer sample having a cured coating film on its surface, thus obtained, the radius of curvature (Ra) was calculated at an ambient temperature of

TABLE 3

| | Abbreviated name of hard coating composition | PSi-1 solution (mass %) | Solid content in PSi-1 solution (mass %) | | | Organo polysiloxane solution (mass %) | Solid content: organo polysiloxane (mass %) | | | Molecular weight ratio (b)/(a) |
|---|---|---|---|---|---|---|---|---|---|---|
| | | | Organo polysiloxane (b) PSi-1 | Silica particles | Ultraviolet absorber | | Ex. 35 MSi-4 | 36 KR220L | Ex. 37 KR500 | |
| Ex. 38 | HC-7 | 80 | 13.4 | 5.8 | 0.8 | 20 | 5 | — | — | 0.60 |
| Ex. 39 | HC-12 | 100 | 16.8 | 7.2 | 1.0 | — | — | — | — | — |
| Ex. 40 | HC-13 | 80 | 13.4 | 5.8 | 0.8 | 20 | — | 5 | — | 0.14 |
| Ex. 41 | HC-14 | 80 | 13.4 | 5.8 | 0.8 | 20 | — | — | 5 | 0.54 |

Solid content: organo polysiloxane (mass %)

(Measurement of Tensile Stress (σ) Relating to Hard Coating Composition)

With respect to cured coating films obtained by using the hard coating compositions obtained in the above Examples 6 to 15 and the hard coating compositions obtained in Examples 38 to 41, measurements of the tensile stress (σ) were carried out by the following method.

A silicon wafer having a diameter of 4 inches and a thickness of 525±25 μm was accommodated at a prescribed position in a thin film stress measuring apparatus FLX-2320 (manufactured by KLA Tencor Corporation) with an orientation flat as a standard, and then, the radius of curvature Rb of this silicon wafer was measured at ambient temperature of 25° C.

25° C. in the same manner as in the measurement of the radius of curvature (Rb) of the above simple body of silicon wafer.

By using Ra and Rb measured as described above and further various factors which will be described below, the tensile stress (σ) represented by the following formula (1) was calculated.

$$\sigma = \frac{E \cdot h^2}{(1-v) \cdot 6 \cdot R \cdot t} \quad (1)$$

(wherein R is a difference (Rb−Ra) [m] between the radius of curvature (Rb) of a silicon wafer element as measured at an ambient temperature of 25° C. by a thin film stress measuring apparatus and the radius of curvature (Ra) of a silicon wafer sample having on its surface a cured coating film formed by curing the hard coating composition as a test specimen under conditions of 120° C. for 1 hour, $E/(1-v)$ is a biaxial elastic coefficient (crystal face (100): $1.805 \times 10^{11}$ Pa) as calculated from the elastic modulus E of the silicon wafer and the Poisson's ratio v, h is the thickness [m] of the silicon wafer, and t is the thickness [m] of the cured coating film.)

Using each of the hard coating compositions obtained in Examples 7 to 15 and the hard coating compositions obtained in Examples 38 to 41, a silicon wafer sample having a cured coating film on its surface was prepared in the same manner as described above, and its radius of curvature was measured, whereupon the calculation of the tensile stress (σ) was carried out. The results are shown in Table 4.

TABLE 4

|   | Abbreviated name of hard coating composition | Thickness of cured coating film on silicon wafer (μm) | Tensile stress (MPa) |
|---|---|---|---|
| Ex. 6 | HC-1 | 2.2 | 24.1 |
| Ex. 7 | HC-2 | 2.2 | 29.1 |
| Ex. 8 | HC-3 | 2.5 | 26.1 |
| Ex. 9 | HC-4 | 2.5 | 25.6 |
| Ex. 10 | HC-5 | 2.4 | 27.3 |
| Ex. 11 | HC-6 | 2.4 | 25.3 |
| Ex. 12 | HC-8 | 2.3 | 28.5 |
| Ex. 13 | HC-9 | 1.9 | 28.1 |
| Ex. 14 | HC-10 | 2.3 | 25.7 |
| Ex. 15 | HC-11 | 2.1 | 26.2 |
| Ex. 38 | HC-7 | 2.1 | 26.8 |
| Ex. 39 | HC-12 | 1.9 | 31.9 |
| Ex. 40 | HC-13 | 2.7 | 24.5 |
| Ex. 41 | HC-14 | 2.5 | 26.3 |

[4] Preparation of Resin Substrate Having Hard Coating Layer

Example 16

To a polycarbonate resin plate having a thickness of 3 mm (CARBOGLASS (registered trademark) Polish Clear (tradename, manufactured by Asahi Glass Company, Limited)), an acrylic primer SGP470 (manufactured by Momentive Performance Materials, Inc., solution with solid content of 10 mass %) was applied by a dipping method so that the film thickness after drying would be from 4 to 5 μm, followed by heat drying for 30 minutes by means of a hot air circulation system dryer set at 120° C. to form a primer layer. Then, the hard coating composition HC-1 was applied by a dipping method and left to stand at 25° C. for 20 minutes, followed by curing at 120° C. for one hour to prepare a sample of a resin substrate having a hard coating layer. The thickness of the hard coating layer was 3 μm. This sample is one having the acrylic primer layer and the hard coating layer formed on both sides of the polycarbonate plate.

Examples 17 to 34

A sample of a resin substrate having a hard coating layer was prepared in the same manner as in Example 1 except that one of the hard coating compositions HC-2 to HC-6 and HC-8 to HC-11 prepared in the above [3] was applied by a dipping method so that the thickness of the hard coating layer after curing would be the film thickness shown in Table 5.

Examples 42 to 49

A sample of a resin substrate having a hard coating layer was prepared in the same manner as in Example 16 except that one of the hard coating compositions HC-7 and HC-12 to HC-14 (Examples 38 to 41) prepared in the above [3] was applied by coating in a film thickness shown in Table 6.

Examples 50 and 51

For the purpose of comparison, as commercially available polycarbonate plates having a silicone type hard coating layer, EC100XX (tradename, manufactured by Tsutsunaka Plastic Industry Co., Ltd.) (Example 50) having a primer layer and a silicone type hard coating layer sequentially formed on a polycarbonate plate having a thickness of 5 mm, and Lexan (registered trademark) Margard MR10 (tradename, manufactured by SABIC Innovative Plastics) (Example 51) having a primer layer and a silicone type hard coating layer sequentially formed on a polycarbonate plate having a thickness of 3 mm, were used.

[5] Evaluation of Resin Substrate Samples Having Hard Coating Layer

Resin substrate samples having a hard coating layer obtained in the respective Examples in the above [4], evaluations of the following items were carried out. Specifically, using the resin substrate samples obtained in Examples 16 to 49, tests on the initial appearance, adhesion, abrasion resistance and durability (water resistance, moisture resistance, heat resistance) were carried out. The evaluation results are shown in Table 5 with respect to Examples 16 to 34 and in Table 6 with respect to Examples 42 to 49. Further, using the resin substrate samples obtained in Examples 16 to 25 and Examples 42 to 46, the weather resistance test was carried out. The results are shown in Table 7. Further, with respect to the forcible bending test carried out by using the resin substrate samples obtained in Examples 26 to 34 and Examples 47 to 51, the evaluation results are shown in Table 8.

<1> Appearance

The hard coating film (the entire coating film including the primer layer and the hard coating layer is referred to as "the hard coating film") was visually observed, whereby the presence or absence of abnormality was judged.

○: No abnormality observed.

x: Cracks observed in the hard coating film

<2> Film Thickness

The thickness of the hard coating layer in each sample was measured by using an interference film thickness measuring apparatus (Solid Lambda Thickness, manufactured by Spectra Co-op). At that time, as the refractive index, a value of n=1.46 was used <3> Abrasion Resistance In accordance with JIS K5600 (5.9), on a Taber abrasion tester (model: TORARY ABRASION TESTER, manufactured by Toyo Seiki Seisaku-Sho, Ltd.), a truck wheel CALIBRASE (registered trademark) CS-10F (manufactured by TABER Industries) was mounted and rotated 500 times under a load of 500 g, whereupon the haze was measured, and the haze difference $\Delta H_{500}$ between before and after the test was taken as the abrasion resistance. The haze was measured in accordance with JIS K7105 (6.4) by means of a hazemeter (model: HGM-2 manufactured by Suga Test Instruments Co., Ltd.).

<4> Adhesion

In accordance with JIS K5600 (5.6), by means of a razor blade, 11 cut lines were made at 1 mm intervals in each of the vertical and horizontal directions to form 100 squares, and an adhesive tape (CT24, manufactured by NICHIBAN CO., LTD.) was well bonded thereto, followed by a peel test. The number of squares (X) where the hard coating film remained without delamination was represented by X/100.

<5> Water Resistance

A sample was immersed in warm water at 40° C. for 30 days, whereupon the change in appearance and the adhesion were evaluated with respect to cracks, the presence or absence of delamination and white turbidity.

<6> Moisture Resistance

A sample was left to stand for 30 days in a constant temperature tank at 50° C. under a relative humidity of 95%, whereupon the change in appearance and the adhesion were evaluated with respect to cracks, the presence or absence of delamination and white turbidity of the hard coating film.

<7> Heat Resistance

A sample was heated for 30 days in a hot air circulating oven at 110° C., whereupon the change in appearance and the adhesion were evaluated with respect to cracks and the presence or absence of delamination of the hard coating film.

<8> Weather Resistance

Using an accelerated weather resistance tester (DAIPLA METAL WEATHER KU-R4 manufactured by DAIPLA WINTES CO., LTD) employing a metal halide lamp as a light source, three conditions of light irradiation, dew condensation and total darkness were continuously applied to the resin substrate sample obtained in each of Examples 16 to 25 and Examples 42 to 46, and after 792-hours and 996 hours, the presence or absence of cracks and delamination of the hard coating film were visually evaluated (weather-cracking resistance). With respect to a sample wherein cracks or delamination of the hard coating film was observed before 792 hours, the time was recorded. Here, the evaluation with respect to the weather-cracking resistance was carried out also before the weather resistance test. Further, before and after the weather resistance test, the yellowness index and change of yellowness index ΔYI, and the haze and haze difference ΔH, were measured.

Here, the conditions for the above irradiation are such that light is applied for 4 hours under such conditions that the illuminance is 90 mW/cm$^2$, the black panel temperature is 63° C. and the relative humidity is 70%; the conditions for the dew condensation are such that the black panel temperature is naturally left to cool from 70° C. to 30° C. and maintained under a condition of a relative humidity of 98% without irradiation with light; and the conditions for the above total darkness are such that the sample is maintained for 4 hours without irradiation with light under such conditions that the black panel temperature is 70° C. and the relative humidity is 90%.

<8-1> Weather-Cracking Resistance

Before the weather resistance test (initial stage)/after the weather resistance test, the appearance of the hard coating film was visually observed, and the presence or absence of abnormality was judged by the following standards.

○: No abnormality observed.

x: Cracks observed in the hard coating film xx: Delamination of the hard coating film observed <8-2> Yellowness Index and Change of Yellowness Index ΔYI In accordance with the transmission measurement method in JIS K7105 (6.3), transmission spectra before the weather resistance test (initial stage), after 792 hours and after 996 hours, were measured, and the yellowness index was calculated from the obtained results. The yellowness index before the weather-resistance test is represented by $YI_0$, the difference in yellowness index between before the test and after expiration of 792 hours is represented by $\Delta YI_{792}$, and the difference in yellowness index between before the test and after 995 hours is represented by $\Delta YI_{996}$. As a judgment standard, $\Delta YI \leq +5$ was regarded as "pass".

<8-3> Haze (Unit: %) and Haze Difference ΔH

In accordance with JIS K7105 (6.4), the haze before the weather resistance test (initial stage), after 792 hours and after 996 hours, was measured by means of a hazemeter (HGM-2 manufactured by Suga Test Instruments Co., Ltd.). The haze difference ΔH between before and after the test was evaluated. The haze before the weather resistance test is represented by $H_0$, the difference in haze between before the test and after 792 hours is represented by $\Delta H_{792}$, and the difference in haze between the test and after 996 hours is represented by $\Delta H_{996}$. As a judgment standard, $\Delta H \leq +5\%$ is regarded as "pass".

<9> Forcible Bending Test

Using a forcible bending test jig, of which a perspective view is shown in FIG. 1, a forcible bending test was carried out by the following method with respect to the resin substrate samples obtained in Examples 26 to 34 and Examples 47 to 51.

In the cold forming of a polycarbonate plate, the allowable radius of curvature R for each plate thickness at ordinary temperature is represented by the following formula (I)

$$R = 180t \quad (I)$$

(wherein t is the thickness [mm] of the polycarbonate substrate.)

Based on this formula, the length of the test specimen of the resin substrate sample having a hard coating layer and the fixed length (shown by "L" in FIG. 1) were determined, and the forcible bending jig 1 as shown in FIG. 1 was prepared for every thickness of the polycarbonate plate. For a sample of a polycarbonate plate having a hard coating layer employing a polycarbonate plate having a thickness of 3 mm, a forcible bending test jig having a fixed length L=185 mm was prepared, and a test specimen 2 cut into 20 mm×186 mm was fixed thereto. For a sample of a polycarbonate plate having a hard coating layer employing a polycarbonate plate having a thickness of 5 mm, a forcible bending test jig having a fixed length L=246 mm was prepared, and a test specimen cut into 20 mm×247 mm was fixed thereto.

One having the sample of a polycarbonate plate having a hard coating layer fixed in a bent state to the forcible bending test jig 1, was introduced into a constant temperature constant humidity tank at a temperature of 80° C. under a relative humidity of 95% and held as it was to carry out an accelerated test as a forcible bending test, whereby the following forcible bending appearance judgment and forcible bending crack resistance after 240 hours were evaluated.

<9-1> Forcible Bending Appearance Judgment after 240 Hours

After 240 hours, cracks in the hard coating film and presence or absence of gathering of very fine cracks (crazing) in the polycarbonate substrate were observed, and the presence or absence of abnormality was judged by visual observation by the following standards. Here, a sample of the resin substrate having a hard coat layer obtained in each Example in the above [4] used in the test is a one having a hard coating film 4 composed of a primer layer and a hard coating layer formed on both sides of the polycarbonate substrate being a resin substrate 3. With respect to formation of cracks in the hard coating film, a case where such formation is observed on at least one side of the hard coating film, is judged to be "x". Further, the crazing is one caused by a tensile stress of the hard coating film.

◯: No abnormality observed.

x: Cracks observed in the hard coating film xx: Crazing observed in the polycarbonate substrate <9-2> Forcible Bending Crack Resistance With respect to one having no problem in the appearance judgment after 240 hours, the test was continued to investigate the time for formation of cracks in the hard coating film, and judgment was made with respect to the superiority of the resin substrate having the hard coating layer of the present invention.

Further, with respect to the resin substrate samples obtained in Examples 26 to 34 and Examples 47 to 51 used for the forcible test, the same test as the above described weather resistance test was carried out for the loading time of 996 hours, whereby the crack resistance was evaluated. With respect to a sample wherein cracks or delamination of the hard coating film was observed before 996 hours, the time was recorded.

TABLE 5

| | Hard coating composition (abbreviated name) | Film thickness (μm) | Initial stage Appearance | Adhesion | Abrasion resistance $\Delta H_{500}$ (%) | Water resistance Appearance | Adhesion | Moisture resistance Appearance | Adhesion | Heat resistance Appearance | Adhesion |
|---|---|---|---|---|---|---|---|---|---|---|---|
| Ex. 16 | HC-1 | 3 | ◯ | 100/100 | 7.7 | ◯ | 100/100 | ◯ | 100/100 | ◯ | 100/100 |
| Ex. 17 | HC-2 | 3 | ◯ | 100/100 | 7.7 | ◯ | 100/100 | ◯ | 100/100 | ◯ | 100/100 |
| Ex. 18 | HC-3 | 4 | ◯ | 100/100 | 7.1 | ◯ | 100/100 | ◯ | 100/100 | ◯ | 100/100 |
| Ex. 19 | HC-4 | 3 | ◯ | 100/100 | 8.4 | ◯ | 100/100 | ◯ | 100/100 | ◯ | 100/100 |
| Ex. 20 | HC-5 | 3 | ◯ | 100/100 | 9.5 | ◯ | 100/100 | ◯ | 100/100 | ◯ | 100/100 |
| Ex. 21 | HC-6 | 3 | ◯ | 100/100 | 6.6 | ◯ | 100/100 | ◯ | 100/100 | ◯ | 100/100 |
| Ex. 22 | HC-8 | 4 | ◯ | 100/100 | 5.7 | ◯ | 100/100 | ◯ | 100/100 | ◯ | 100/100 |
| Ex. 23 | HC-9 | 4 | ◯ | 100/100 | 5.4 | ◯ | 100/100 | ◯ | 100/100 | ◯ | 100/100 |
| Ex. 24 | HC-10 | 3 | ◯ | 100/100 | 5.5 | ◯ | 100/100 | ◯ | 100/100 | ◯ | 100/100 |
| Ex. 25 | HC-11 | 3 | ◯ | 100/100 | 6.0 | ◯ | 100/100 | ◯ | 100/100 | ◯ | 100/100 |
| Ex. 26 | HC-2 | 2 | ◯ | 100/100 | 7.7 | ◯ | 100/100 | ◯ | 100/100 | ◯ | 100/100 |
| Ex. 27 | HC-2 | 4 | ◯ | 100/100 | 7.7 | ◯ | 100/100 | ◯ | 100/100 | ◯ | 100/100 |
| Ex. 28 | HC-2 | 8 | ◯ | 100/100 | 7.7 | ◯ | 100/100 | ◯ | 100/100 | ◯ | 100/100 |
| Ex. 29 | HC-3 | 3 | ◯ | 100/100 | 7.1 | ◯ | 100/100 | ◯ | 100/100 | ◯ | 100/100 |
| Ex. 30 | HC-4 | 2 | ◯ | 100/100 | 8.4 | ◯ | 100/100 | ◯ | 100/100 | ◯ | 100/100 |
| Ex. 31 | HC-5 | 2 | ◯ | 100/100 | 9.5 | ◯ | 100/100 | ◯ | 100/100 | ◯ | 100/100 |
| Ex. 32 | HC-8 | 2 | ◯ | 100/100 | 5.7 | ◯ | 100/100 | ◯ | 100/100 | ◯ | 100/100 |
| Ex. 33 | HC-9 | 2 | ◯ | 100/100 | 5.4 | ◯ | 100/100 | ◯ | 100/100 | ◯ | 100/100 |
| Ex. 34 | HC-10 | 3 | ◯ | 100/100 | 5.3 | ◯ | 100/100 | ◯ | 100/100 | ◯ | 100/100 |

TABLE 6

| | Hard coating composition (abbreviated name) | Film thickness (μm) | Initial stage Appearance | Adhesion | Abrasion resistance $\Delta H_{500}$ (%) | Water resistance Appearance | Adhesion | Moisture resistance Appearance | Adhesion | Heat resistance Appearance | Adhesion |
|---|---|---|---|---|---|---|---|---|---|---|---|
| Ex. 42 | HC-7 | 3 | ◯ | 100/100 | 5.0 | ◯ | 100/100 | ◯ | 100/100 | ◯ | 100/100 |
| Ex. 43 | HC-12 | 3 | ◯ | 100/100 | 6.6 | ◯ | 100/100 | ◯ | 100/100 | ◯ | 100/100 |
| Ex. 44 | HC-12 | 4 | ◯ | 100/100 | 7.1 | ◯ | 100/100 | ◯ | 100/100 | X | — |
| Ex. 45 | HC-13 | 3 | ◯ | 100/100 | 7.9 | ◯ | 100/100 | ◯ | 100/100 | ◯ | 100/100 |
| Ex. 46 | HC-14 | 3 | ◯ | 100/100 | 6.7 | ◯ | 100/100 | ◯ | 100/100 | X | — |
| Ex. 47 | HC-12 | 2 | ◯ | 100/100 | 7.1 | ◯ | 100/100 | ◯ | 100/100 | ◯ | 100/100 |
| Ex. 48 | HC-13 | 2 | ◯ | 100/100 | 7.9 | ◯ | 100/100 | ◯ | 100/100 | ◯ | 100/100 |
| Ex. 49 | HC-14 | 2 | ◯ | 100/100 | 6.7 | ◯ | 100/100 | ◯ | 100/100 | ◯ | 100/100 |

TABLE 7

| | Initial physical properties | | | | Weather resistance test after 792 hours | | | Weather resistance test after 996 hours | | |
|---|---|---|---|---|---|---|---|---|---|---|
| | Film thickness (μm) | Weather-cracking resistance | $YI_0$ | $H_0$ (%) | Weather-cracking resistance | $\Delta YI_{792}$ | $\Delta H_{792}$ (%) | Weather-cracking resistance | $\Delta YI_{996}$ | $\Delta H_{996}$ (%) |
| Ex. 16 | 3 | ○ | 0.71 | 0.3 | ○ | +0.59 | +0.1 | ○ | +0.80 | +0.1 |
| Ex. 17 | 3 | ○ | 0.61 | 0.3 | ○ | +0.59 | +0.2 | ○ | +0.65 | +0.2 |
| Ex. 18 | 4 | ○ | 0.99 | 0.2 | ○ | −0.06 | +0.3 | ○ | +0.64 | +0.7 |
| Ex. 19 | 3 | ○ | 0.64 | 0.2 | ○ | +0.55 | +0.3 | ○ | +0.83 | +0.3 |
| Ex. 20 | 3 | ○ | 0.80 | 0.3 | ○ | +0.44 | +0.2 | ○ | +0.90 | +0.4 |
| Ex. 21 | 3 | ○ | 0.66 | 0.2 | ○ | +0.32 | +0.2 | ○ | +0.90 | +0.5 |
| Ex. 22 | 4 | ○ | 0.96 | 0.2 | ○ | +0.05 | +0.2 | ○ | +0.29 | +0.5 |
| Ex. 23 | 4 | ○ | 0.94 | 0.2 | ○ | +0.19 | +0.3 | ○ | +0.48 | +0.7 |
| Ex. 24 | 3 | ○ | 0.64 | 0.2 | ○ | +0.24 | +0.5 | ○ | +0.97 | +0.3 |
| Ex. 25 | 3 | ○ | 0.64 | 0.2 | ○ | +0.33 | +0.3 | ○ | +1.00 | +0.3 |
| Ex. 42 | 3 | ○ | 1.13 | 0.5 | ○ | −0.18 | +0.3 | X | — | — |
| Ex. 43 | 3 | ○ | 0.92 | 0.4 | ○ | +0.02 | +0.4 | X | — | — |
| Ex. 44 | 4 | ○ | 1.58 | 0.3 | ○ | +0.21 | +0.2 | X | — | — |
| Ex. 45 | 3 | ○ | 0.60 | 0.2 | ○ | +0.27 | +0.2 | X | — | — |
| Ex. 46 | 3 | ○ | 0.65 | 0.3 | X | — | — | | | |

TABLE 8

| | Film thickness (μm) | Weather resistance test (after 996 hours) Weather-cracking resistance | Forcible bending test | |
|---|---|---|---|---|
| | | | Appearance after 240 hours | Time for forming cracks (hrs) |
| Ex. 26 | 2 | ○ | ○ | >1,000 |
| Ex. 27 | 4 | ○ | ○ | 792 |
| Ex. 28 | 8 | ○ | x | 48 |
| Ex. 29 | 3 | ○ | ○ | >1,000 |
| Ex. 30 | 2 | ○ | ○ | >1,000 |
| Ex. 31 | 2 | ○ | ○ | >1,000 |
| Ex. 32 | 2 | ○ | ○ | >1,000 |
| Ex. 33 | 2 | ○ | ○ | >1,000 |
| Ex. 34 | 3 | ○ | ○ | >1,000 |
| Ex. 47 | 2 | x | x x | 216 |
| Ex. 48 | 2 | x | x | 60 |
| Ex. 49 | 2 | x | x | 60 |
| Ex. 50 | — | x x (396 hours) | x x | 100 |
| Ex. 51 | — | x (396 hours) | x | 64 |

As shown in Table 7, with the samples in Examples 42 to 46 being comparative examples, cracks were formed in the hard coating film, and the judgment of the appearance of the hard coating film was "x" after 792 hours or 996 hours in the weather resistance test, and thus, they failed the test. Further, as shown in Table 8, with the samples in Examples 47 to 49 being comparative examples, after 996 hours in the weather resistance test, and with the samples of commercial products in Examples 50 and 51, after 396 hours in the weather resistance test, cracks or delamination was formed in the hard coating film, and thus, they failed the test. On the other hand, in Examples 16 to 34 being working examples of the present invention, the judgment of the appearance of the hard coating film was "○" after 996 hours in the weather resistance test, thus indicating that they are superior in the weather cracking resistance to Examples 42 to 51. Further, Examples 16 to 25 being working examples of the present invention, had no problem also with respect to the change of yellowness index ΔYI and the haze difference ΔH.

As shown in Table 6, Examples 42 to 49 being comparative examples, had no problem with respect to the initial appearance, adhesion and abrasion resistance, and further, Examples 42, 43, 45 and 47 to 49 maintained the water resistance, moisture resistance and heat resistance also in such durability test, but as mentioned above, they failed the weather resistance test after 996 hours, thus indicating the superiority of the hard coating compositions of the present invention.

Examples 47 to 49 being comparative examples had no problem with respect to the initial appearance and abrasion resistance, but the judgment of the appearance after 240 hours in the forcible bending test was "x" or "xx", and thus they failed the test. Whereas, in Examples 26, 27 and 29 to 34 being working examples of the present invention, the judgment of the appearance after 240 hours in the forcible bending test was "○", and thus, it is evident that they are superior in the forcible bending resistance to the comparative examples. As a result of the continued test, the time for forming cracks in the hard coating film was substantially extended and was 792 hours in Example 27 and was at least 1,000 hours in Examples 26 and 29 to 34, thus indicating the superiority of the resin substrates having a hard coating layer of the present invention.

In Example 28 using the same hard coating composition (i.e. HC-2) as in Examples 26 and 27, the thickness of the hard coating layer was 8 μm, whereby although there was no problem with respect to the initial appearance, abrasion resistance and weather resistance test, the judgment of the appearance after 240 hours in the forcible bending test was "x", thus indicating that such a hard coating layer was not useful for forcible bending.

From the foregoing results, it has been found that by the hard coating composition of the present invention, it is possible to obtain a resin substrate having a hard coating layer with the weather resistance improved, which is excellent in heat resistance and weather-cracking resistance more than ever while maintaining the abrasion resistance, water resistance and moisture resistance and which has no problem with respect to the optical performance (change of yellowness index ΔYI or haze difference ΔH). Further, it has been found that by the hard coating composition of the present invention, it is possible to obtain a resin substrate having a hard coating layer which has durability against forcible bending. This is considered to be such that by the addition of the organo polysiloxane (a) of the present invention, it is possible to suppress formation of a stress at the time of heat curing the organo polysiloxane (b) in the hard coating composition. Further, it is considered that it was thereby possible to impart flexibility to the hard coating film to let it have resistance against cracking when exposed to a heat stress or bending stress, and thus the durability against bending was secured.

INDUSTRIAL APPLICABILITY

The resin substrate having a hard coating layer of the present invention is useful as a window glass for a vehicle, to be attached to automobiles or various means of transportation, or as a window glass for a building material to be attached to building construction such as houses or buildings. Further, it is useful also as a building material to be used in a state forcibly bent at ordinary temperature.

This application is a continuation of PCT Application No. PCT/JP2010/055276 filed on Mar. 25, 2010, which is based upon and claims the benefit of priority from Japanese Patent Application No. 2009-080355 filed on Mar. 27, 2009. The contents of those applications are incorporated herein by reference in its entirety.

REFERENCE SYMBOLS

1: Jig for forcible bending test, 2: test specimen, 3: resin substrate, 4: hard coating film, L: fixed length (mm)

What is claimed is:

1. A hard coating composition comprising an organo polysiloxane component consisting of an organo polysiloxane (a) having silicon-containing bond units represented by the following formulae T1 to T3 and an organo polysiloxane (b) having silicon-containing bond units represented by formulae T1 to T3, wherein the organo polysiloxane (a) contains silicon-containing bond units represented by formulae T1 to T3 in a ratio of T1:T2:T3=0-5:15-40:55-85 and in a ratio of T3/T2=1.5-4.0, in a number of such units, wherein a ratio of the number (B) of hydroxy groups bonded to silicon atoms to the number (A) of alkoxy groups bonded to silicon atoms in the organo polysiloxane (a), (B)/(A), is from 12 to 58.7, and which has a weight average molecular weight of from 800 to 8,000, and wherein the organo polysiloxane (b) is an organo polysiloxane having a weight average molecular weight between 1/10 and 1/1.5 of the weight average molecular weight of the organo polysiloxane (a):

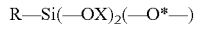 T1:

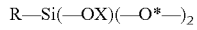 T2:

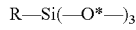 T3:

wherein R is a hydrogen atom or a $C_{1-10}$ substituted or unsubstituted monovalent organic group, X is a hydrogen atom or a $C_{1-6}$ alkyl group, and O* is an oxygen atom linking two silicon atoms, and the ratio of the content of the organo polysiloxane (b) to the organo polysiloxane (a) is from 1.5 to 30 by mass ratio;

wherein a proportion of the number of T units in said organo polysiloxane (a) is 95 to 100% based on the total number of units T, M, D and Q, wherein M is of formula $R_3$—Si(—O*—), Q is of formula Si(—O*—)$_4$ and D is of formula $R_2$—Si(—O*—)$_2$; and wherein the total number of units D in the organo polysiloxane (b) is 0.

2. The hard coating composition according to claim 1, whereby a cured film having a tensile stress (σ) as represented by the following formula (1), of at most 31 MPa, is obtainable, $$\sigma = \frac{E \cdot h^2}{(1-v) \cdot 6 \cdot R \cdot t} \tag{1}$$

wherein R is a difference [m] between the radius of curvature of a silicon wafer itself as measured at an ambient temperature of 25° C. by a thin film stress measuring apparatus and the radius of curvature of a silicon wafer sample prepared by using the silicon wafer and having on its surface a cured coating film formed by curing the hard coating composition as a test specimen under conditions of 120° C. for 1 hour, E/(1−v) is a biaxial elastic coefficient (crystal face (100): 1.805×10$^{11}$ Pa) as calculated from the elastic modulus E of the silicon wafer and the Poisson's ratio v, h is the thickness [m] of the silicon wafer, and t is the thickness [m] of the cured coating film.

3. The hard coating composition according to claim 1, wherein the organo polysiloxane (b) is obtained by subjecting an alkoxysilane to hydrolytic condensation in a solvent in the presence of acetic acid as an acid catalyst.

4. The hard coating composition according to claim 1, wherein the organo polysiloxane (b) also contains T0 units, which are non-reacted T monomers, not silicon-containing bond units and which are represented by the formula T0: R—Si(—OX)$_3$, wherein T0 units and the silicon-containing bond units represented by formulae T0 to T3 are in a ratio of T0:T1:T2:T3=0-5:0-50:5-70:10-90.

5. The hard coating composition according to claim 1, wherein a proportion of T units in said organo polysiloxane (b) is 90 to 100% based on the total number of units T, M, and Q, wherein M is of formula $R_3$—Si(—O*—), and Q is of formula Si(—O*—)$_4$.

6. The hard coating composition according to claim 1, wherein the total number of units M in the organo polysiloxane (b) is 0.

7. The hard coating composition according to claim 1, wherein the total number of units Q in the organo polysiloxane (b) is 0.

8. The hard coating composition according to claim 1, wherein the total number of units T in the organo polysiloxane (b) based on the total number of units T, M, and Q is at least 99.9.

9. The hard coating composition according to claim 1, wherein X is a methyl group.

10. The hard coating composition according to claim 1, wherein the organo polysiloxane (a) has a weight average molecular weight of from 1,000 to 6,000.

11. The hard coating composition according to claim 1, which contains a solvent to dissolve the organo polysiloxane (a) and the organo polysiloxane (b), in an amount of at least 20 mass % based on the entire amount of the composition.

12. The hard coating composition according to claim 11, wherein based on the entire amount of the composition excluding the solvent, the content of the organo polysiloxane (a) is from 1 to 35 mass %, and the content of the organo polysiloxane (b) is from 40 to 65 mass %.

13. The hard coating composition according to claim 1, which further contains silica particles (c) having an average particle size of from 1 to 100 nm.

14. The hard coating composition according to claim 13, which further contains a solvent, and wherein based on the entire amount of the composition excluding the solvent, the content of the organo polysiloxane (a) is from 1 to 35 mass %, the content of the organo polysiloxane (b) is from 40 to 65 mass %, and the content of the silica particles (c) is from 1 to 50 mass %.

15. The hard coating composition according to claim 1, wherein the organo polysiloxane (a) is produced by subjecting an organo polysiloxane having a ratio (B)/(A) lower than that of organo polysiloxane (a) to hydrolysis of alkoxy groups in the presence of an acid catalyst.

16. The hard coating composition according to claim 15, wherein the organo polysiloxane (a) has a weight average molecular weight of from 1,000 to 6,000.

17. The hard coating composition according to claim 15, wherein R and X are both $CH_3$.

18. The hard coating composition according to claim 15, which contains a solvent to dissolve the organo polysiloxane (a) and the organo polysiloxane (b), in an amount of at least 20 mass % based on the entire amount of the composition.

19. The hard coating composition according to claim 18, wherein based on the entire amount of the composition excluding the solvent, the content of the organo polysiloxane (a) is from 1 to 35 mass %, and the content of the organo polysiloxane (b) is from 40 to 65 mass %.

20. The hard coating composition according to claim 15, which further contains silica particles (c) having an average particle size of from 1 to 100 nm.

21. The hard coating composition according to claim 20, which further contains a solvent, and wherein based on the entire amount of the composition excluding the solvent, the content of the organo polysiloxane (a) is from 1 to 35 mass %, the content of the organo polysiloxane (b) is from 40 to 65 mass %, and the content of the silica particles (c) is from 1 to 50 mass %.

22. A resin substrate having, on at least one side thereof, a hard coating layer made of a cured product of the hard coating composition as defined in claim 1.

23. The resin substrate having a hard coating layer according to claim 22, wherein the hard coating layer has a thickness of from 0.1 to 20 μm.

24. The resin substrate having a hard coating layer according to claim 22, which has a primer layer between the resin substrate and the hard coating layer.

25. The resin substrate having a hard coating layer according to claim 22, wherein the material for the resin substrate is a polycarbonate resin.

26. The resin substrate having a hard coating layer according to claim 22, which is a flat plate form, is forcibly bendable and is operable in a bent state at ordinary temperature.

27. The resin substrate having a hard coating layer according to claim 26, wherein the operability in a bent state is carried out under a condition of at least an allowable radius of curvature.

28. The resin substrate having a hard coating layer according to claim 26, wherein the hard coating layer has a thickness of from 0.1 to 6 μm.

* * * * *